(12) United States Patent
Sarkis et al.

(10) Patent No.: US 9,141,851 B2
(45) Date of Patent: Sep. 22, 2015

(54) DEFORMABLE EXPRESSION DETECTOR

(71) Applicant: QUALCOMM Incorporated, San Diego, CA (US)

(72) Inventors: Michel Adib Sarkis, San Diego, CA (US); Magdi Abuelgasim Mohamed, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 14/037,927

(22) Filed: Sep. 26, 2013

(65) Prior Publication Data

US 2015/0003672 A1   Jan. 1, 2015

Related U.S. Application Data

(60) Provisional application No. 61/840,687, filed on Jun. 28, 2013.

(51) Int. Cl.
*G06K 9/00* (2006.01)
*G06K 9/62* (2006.01)
*G06K 9/32* (2006.01)

(52) U.S. Cl.
CPC ........ *G06K 9/00288* (2013.01); *G06K 9/00302* (2013.01); *G06K 9/00315* (2013.01); *G06K 9/3241* (2013.01); *G06K 9/6254* (2013.01); *G06K 9/6262* (2013.01); *G06K 9/6263* (2013.01)

(58) Field of Classification Search
None
See application file for complete search history.

(56) References Cited

U.S. PATENT DOCUMENTS

| | | | |
|---|---|---|---|
| 6,246,787 B1 * | 6/2001 | Hennessey et al. | 382/141 |
| 6,492,986 B1 | 12/2002 | Metaxas et al. | |
| 8,184,869 B2 | 5/2012 | Cazier | |
| 2007/0179396 A1 * | 8/2007 | Le et al. | 600/544 |
| 2007/0189584 A1 | 8/2007 | Li | |
| 2008/0097946 A1 * | 4/2008 | Oliver et al. | 706/46 |
| 2008/0266398 A1 * | 10/2008 | Ferguson | 348/181 |
| 2010/0034479 A1 * | 2/2010 | Hogasten | 382/254 |
| 2010/0296706 A1 | 11/2010 | Kaneda et al. | |
| 2011/0063118 A1 * | 3/2011 | Sato et al. | 340/635 |
| 2012/0128256 A1 * | 5/2012 | Mishima et al. | 382/209 |
| 2013/0142401 A1 | 6/2013 | Nomoto et al. | |
| 2014/0153832 A1 * | 6/2014 | Kwatra et al. | 382/195 |
| 2014/0241648 A1 * | 8/2014 | Kunishige et al. | 382/309 |

OTHER PUBLICATIONS

Cao T.P., et al., "Real-Time Vision-Based Stop Sign Detection System on FPGA", Computing: Techniques and Applications, 2008. DICTA '08.Digital Image, IEEE, Piscataway, NJ, USA, Dec. 1, 2008, pp. 465-471, XP031371914, ISBN: 978-0/7695-3456-5 Section 3.2. 1.

(Continued)

*Primary Examiner* — Randolph I Chu
(74) *Attorney, Agent, or Firm* — Austin Rapp & Hardman

(57) ABSTRACT

A method for deformable expression detection is disclosed. For each pixel in a preprocessed image, a sign of a first directional gradient component and a sign of a second directional gradient component are combined to produce a combined sign. Each combined sign is coded into a coded value. An expression in an input image is detected based on the coded values.

49 Claims, 13 Drawing Sheets

(56) References Cited

OTHER PUBLICATIONS

Gritti T., et al., "Local features based facial expression recognition with face registration errors", 8TH IEEE International Conference on Automatic Face & Gesture Recognition, FG '08, Sep. 17-19, 2008, IEEE, Piscataway, NJ, USA, Sep. 17, 2008, pp. 1-8, XP031448415, ISBN: 978-1-4244-2153-4 abstract section 3.1 and 3.2.

Lee S., et al., "HOG feature extractor circuit for real-time human and vehicle detection", TENCON 2012-2012 IEEE Region 10 Conference, IEEE, Nov. 19, 2012, pp. 1-5, XP032309614, DOI: 10.1109/TENCON.2012.6412287 ISBN: 978-1-4673-4823-2 figure 4.

Partial International Search Report—PCT/US2014/042162—ISA/EPO—Oct. 2, 2014.

Ahonen T, et al., "Face Recognition with Local Binary Patterns", Apr. 22, 2004, Computer Vision-ECCV 2004; [Lecture Notes in Computer Science;;LNCS], Springer-Verlag, Berlin/Heidelberg, pp. 469-481, XP019005797, ISBN: 978-3-540-21984-2 Section 2; figure 2.

International Search Report and Written Opinion—PCT/US2014/042162—ISA/EPO—Feb. 26, 2015.

Kaimin Yu, et al., "Harvesting Web Images for Realistic Facial Expression Recognition", Digital Image Computing: Techniques and Applications (DICTA), 2010 International Conference on, IEEE, Piscataway, NJ. USA, Dec. 1, 2010, pp. 516-521. XP031853222, ISBN: 978-1-4244-8816-2 abstract; figure 3 Section 4.2.2.

Tomaselli V, et al., "Low complexity smile detection technique for mobile devices", Proceedings of SPIE, vol. 8661, Mar. 6, 2013, XP055164400, ISSN: 0277-786X, DOI: 10.1117112.2002449 abstract; figures 1,3,6,7 Eq. (2).

Wang J G, et al., "Active Learning for Solving the Incomplete Data Problem in Facial Age Classification by the Furthest Nearest-Neighbor Criterion", IEEE Transactions on Image Processing, IEEE Service Center, Piscataway, NJ, US, vol. 20, No. 7, Jul. 1, 2011, pp. 2049-2062, XP011374277, ISSN: 1057-7149, DOI: 10.1109/TIP.2011.2106794 last 10 lines on the right-hand column on p. 2049.

* cited by examiner

DEFORMABLE EXPRESSION DETECTOR

RELATED APPLICATIONS

This application is related to and claims priority from U.S. Provisional Patent Application Ser. No. 61/840,687, filed Jun. 28, 2013, for "DEFORMABLE EXPRESSION DETECTOR."

TECHNICAL FIELD

The present disclosure relates generally to electronic devices. More specifically, the present disclosure relates to a deformable expression detector.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture or utilize images. For example, a digital camera may capture a digital image.

New and/or improved features of electronic devices are often sought for. As can be observed from this discussion, systems and methods that add new and/or improved features of electronic devices may be beneficial.

SUMMARY

A method for deformable expression detection is described. For each pixel in a preprocessed image, a sign of a first directional gradient component and a sign of a second directional gradient component are combined to produce a combined sign. Each combined sign is coded into a coded value. An expression in an input image is detected based on the coded values.

The input image may be preprocessed to produce the preprocessed image. An input image may be aligned based on a region of interest (ROI). The ROI in the input image may be cropped. The ROI may be scaled. A histogram of the ROI may be equalized.

The directional gradient components may be orthonormal. The directional gradient components may be vertical and horizontal directional gradient components or 45-degree and 135-degree directional gradient components.

The coding may include coding each combined sign into a coded value based on the signs of the directional gradient components without determining the value of the magnitude of the directional gradient components.

The expression may include smiling, blinking or anger. Detecting an expression may include classifying a feature vector using a machine learning algorithm. The machine learning algorithm is a Support Vector Machines (SVM) algorithm, a boosting algorithm or a K-Nearest Neighbors (KNN) algorithm.

A classification error may be updated. An input image may be classified to include an expression or not. A misclassification of the input image may be detected. A classifier may be updated based on the misclassification. Detecting the misclassification may include presenting the input image and a classification to a user. The user may be asked if the classification is correct. User input as to whether the classification is correct may be received. Detecting the misclassification may include determining that a classification is incorrect based on deletion of the input image by a user after classification. The updating may be based on a type of classifier used to classify the input image. The classifier may use a machine learning algorithm.

A decision threshold may be adjusted. An input image may be classified to include an expression or not. A misclassification of the input image may be detected. A decision threshold for the expression may be adjusted manually or based on the misclassification. Detecting the misclassification may include presenting the input image and a classification to a user. The user may be asked if the classification is correct. User input as to whether the classification is correct may be received. Detecting the misclassification may include determining that a classification is incorrect based on deletion of the input image by a user after classification. The adjusting may be based on a type of classifier used to classify the input image. Adjusting the decision threshold for the expression manually may include showing a sliding bar that gives a user an option to adjust the threshold by sliding the bar on the screen or entering a value manually. The classifying may include classifying a feature vector using a machine learning algorithm.

An apparatus for deformable expression detection is also described. The apparatus includes a processor, memory in electronic communication with the processor and instructions stored in memory. For each pixel in a preprocessed image, a sign of a first directional gradient component and a sign of a second directional gradient component are combined to produce a combined sign. Each combined sign is coded into a coded value. An expression in an input image is detected based on the coded values.

An apparatus for deformable expression detection is also described. The apparatus includes means for combining, for each pixel in a preprocessed image, a sign of a first directional gradient component and a sign of a second directional gradient component to produce a combined sign. The apparatus also includes means for coding each combined sign into a coded value. The apparatus further includes means for detecting an expression in an input image based on the coded values.

A computer-program product for deformable expression detection is also described. The computer-program product includes a non-transitory computer-readable medium having instructions thereon. The instructions include code for causing an electronic device to combine, for each pixel in a preprocessed image, a sign of a first directional gradient component and a sign of a second directional gradient component to produce a combined sign. The instructions also include code for causing the electronic device to code each combined sign into a coded value. The instructions further include code for causing the electronic device to detect an expression in an input image based on the coded values.

DETAILED DESCRIPTION

Figure 1:
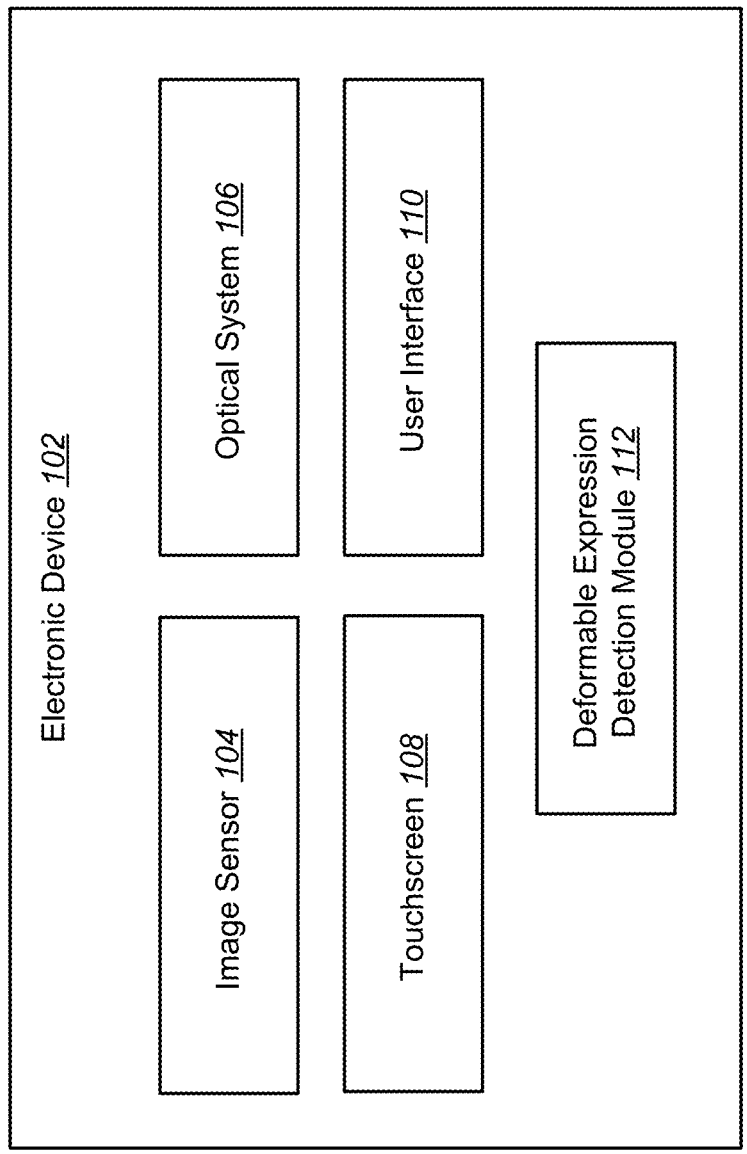
FIG. 1 is a block diagram illustrating an electronic device for deformable expression detection.

A deformable expression may indicate various emotions, moods, actions or mental states such as happiness, sadness, fear and pleasure. In some configurations, the expressions can be captured from a human's face or gestures. Emotions or mental states may be relevant for applications that may include human machine interface, interactive gaming, patient monitoring and many more. In fact, detecting an expression may make simple applications like taking pictures with cameras or smartphones much simpler since a shutter can wait in the portrait or self-portrait image until the moment a person is actually performing an expression (e.g. smiling, open eyes, etc.).

Expression detection is an active field of research in computer vision. For expression detection, an image containing an object of interest (such as a human face) is first detected. Then, landmarks (e.g., eyes in a face) are located. Based on these landmarks, the image can be rotated, cropped and scaled. Image features may be extracted. A trained classifier may be applied to the extracted features to determine the state of an expression. For example, the classifier may detect a smile from non-smile or open eyes from closed eyes.

It should be noted that smile detection or blinking eye detection are examples of facial expression. However, the present systems and methods are not limited to detecting facial expressions. Therefore, the systems and methods described herein may be used to detect any deformable expression. As used herein, the term "deformable expression" refers to the change in shape (or form) of a human, animal or object over time. Therefore, a deformable expression may include human, animal or object gestures. Examples of deformable expressions include facial expressions such as smiling, blinking, anger or sadness. Another example of a deformable expression includes non-facial expressions such as whether a subject is running or not.

The present systems and methods may utilize an edge histogram descriptor (EHD) for feature extraction based on the magnitude and signs of directional gradient components. Moreover, a modified version of EHD for feature extraction based on the signs of directional gradient components may be used. This modified edge histogram descriptor (mEHD) may provide benefits in that it is hardware friendly and a compact size.

To limit classification errors, the present systems and methods may also integrate one or more feedback units to the overall expression detection mechanism. A first feedback unit may be an interactive user interface (UI). This first feedback unit may detect falsely classified expressions by asking the user about accuracy at random or discrete time points or detecting the errors from deleted images. The first feedback unit may then automatically update the classification algorithm based on the detected error. A second feedback unit may also be an interactive UI. The second feedback unit may give an option to the user to adjust a decision threshold in such a way to fit the user.

FIG. 1 is a block diagram illustrating an electronic device 102 for deformable expression detection. The electronic device 102 may also be referred to as a wireless communication device, a mobile device, mobile station, subscriber station, client, client station, user equipment (UE), remote station, access terminal, mobile terminal, terminal, user terminal, subscriber unit, etc. Examples of electronic devices 102 include laptop or desktop computers, cellular phones, smart phones, wireless modems, e-readers, tablet devices, gaming systems, etc. Some of these devices may operate in accordance with one or more industry standards.

An electronic device 102, such as a smartphone or tablet computer, may include a camera. The camera may include an image sensor 104 and an optical system 106 (e.g., lenses) that focuses images of objects that are located within the field of view of the optical system 106 onto the image sensor 104. An electronic device 102 may also include a camera software application and a display screen. When the camera application is running, images of objects that are located within the field of view of the optical system 106 may be recorded by the image sensor 104. The images that are being recorded by the image sensor 104 may be displayed on the display screen. These images may be displayed in rapid succession at a relatively high frame rate so that, at any given moment in time, the objects that are located within the field of view of the optical system 106 are displayed on the display screen. Although the present systems and methods are described in terms of captured video frames, the techniques discussed herein may be used on any digital image. Therefore, the terms video frame and digital image may be used interchangeably herein.

A user interface 110 of the camera application may permit a user to interact with the deformable expression detection module 112. For example, a user may interact with the deformable expression detection module 112 by using a touchscreen 108. In one configuration, the deformable expression detection module 112 may preprocess an input image, extract a feature vector from the image and classify the image as containing a particular expression or not (e.g., smiling, anger, fear, eyes closed, etc.).

To obtain a feature vector, the present systems and methods may use an edge histogram descriptor (EHD) to detect features in an input image. EHD may include computing the magnitude and sign of the directional gradient components of an image. In addition, the present system may also use a modified EHD (mEHD) which may include computing only the sign of the directional gradient components of an image rather than real values (e.g., magnitude and sign). This optimization may use fewer resources, while maintaining accuracy when compared to EHD.

Furthermore, the deformable expression detection module 112 may include two feedback units to adapt the classification. Specifically, a first feedback unit may update the classification algorithm and a second feedback unit may shift a decision threshold based on user input or based on a perceived misclassification from deleted images.

Figure 1A:
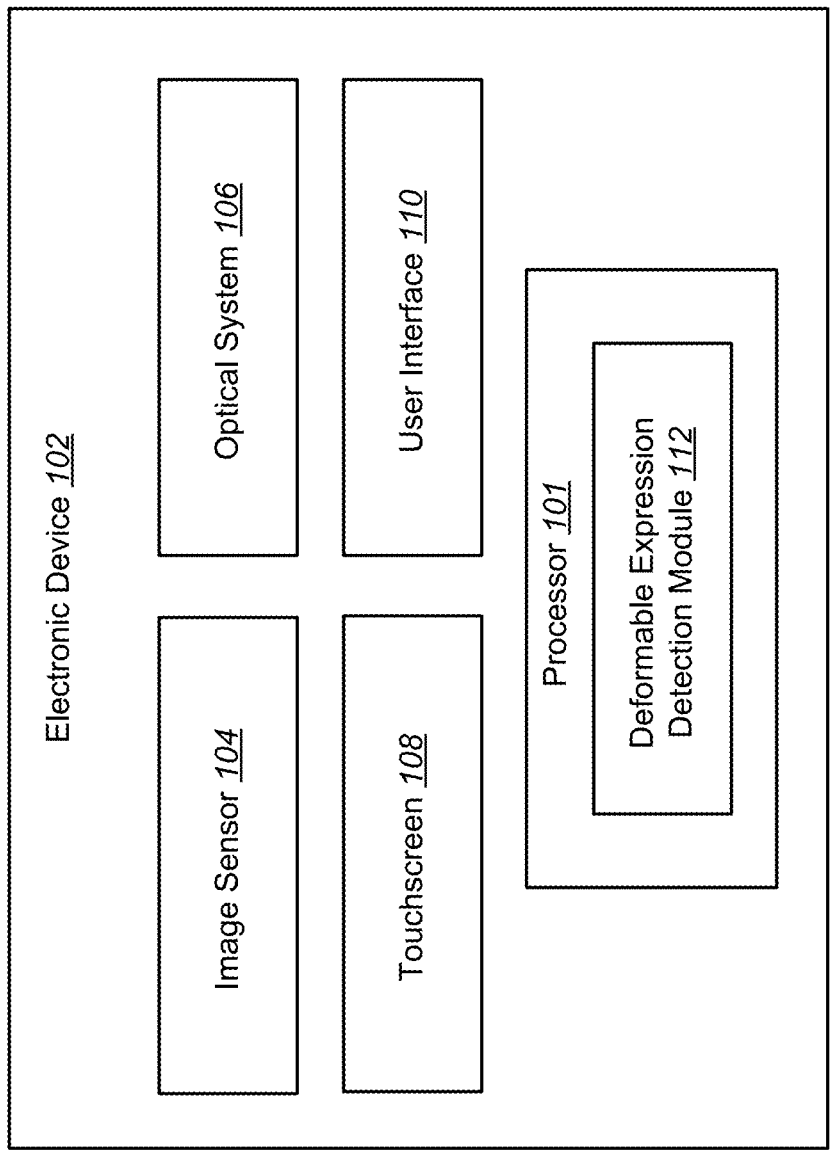
FIG. 1A illustrates some components within the system of FIG. 1 being implemented by a processor.

As shown in FIG. 1A, the deformable expression detection module 112 may be implemented by a processor 101. Alternatively, different processors may be used to implement different components (e.g., one processor may preprocess the image, another processor may be used to obtain a feature vector, another processor may be used to classify an expression).

Figure 2:
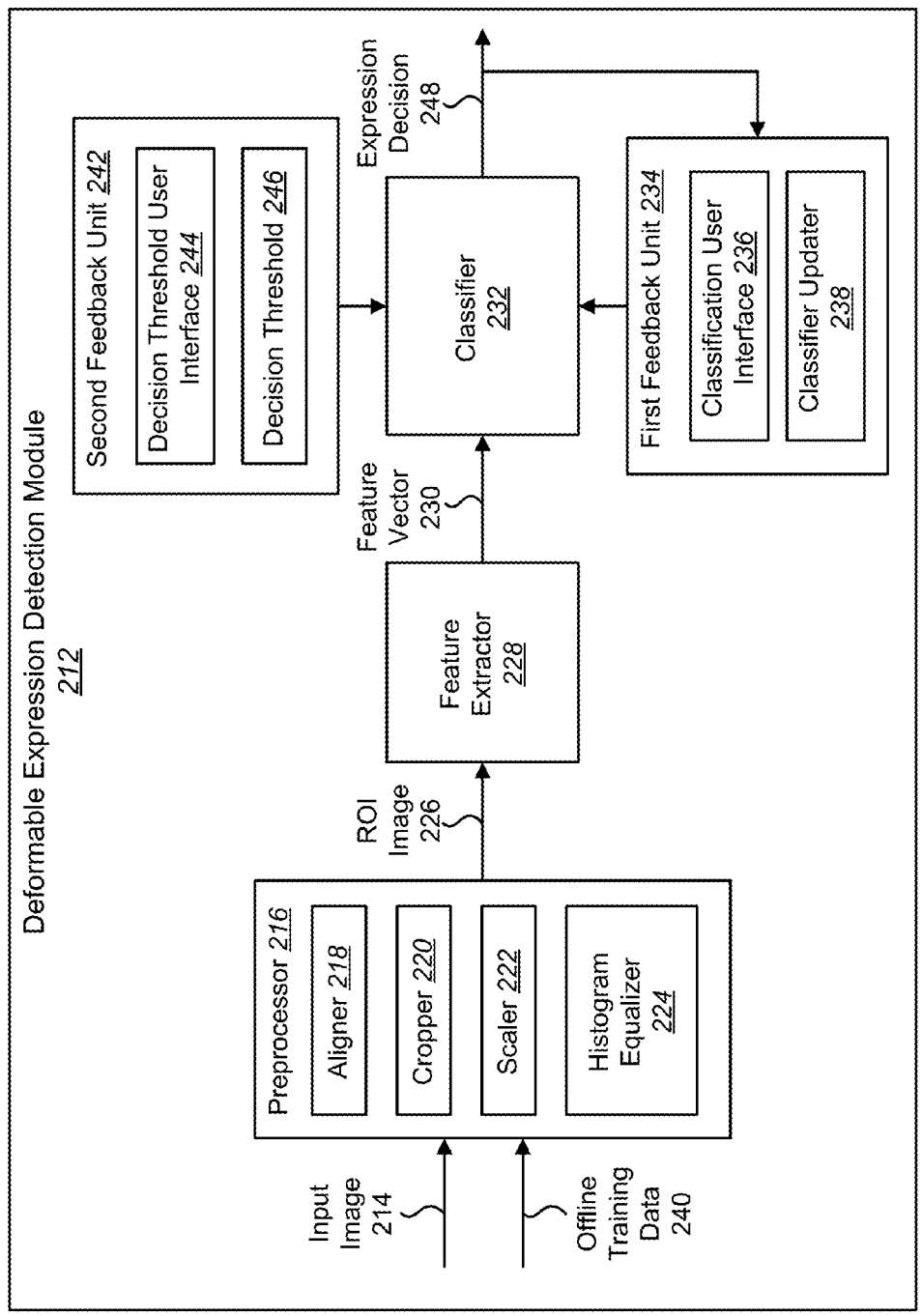
FIG. 2 is a block diagram illustrating a deformable expression detection module.

FIG. 2 is a block diagram illustrating a deformable expression detection module 212. The deformable expression detection module 212 may include a preprocessor 216, a feature extractor 228 and a classifier 232. The preprocessor 216 may receive an input image 214 and may produce an ROI image 226 emphasizing a desired region of interest (ROI). The image 214 may be received from a camera (e.g., an image sensor 104 and an optical system 106). The image 214 may also be received from memory. In some configurations, the ROI may be the face of a subject. However, it should be noted, that the ROI may be any region within the input image 214.

The preprocessor 216 may include an aligner 218 that aligns the input image 214 with respect to the ROI. For example, the aligner 218 may align the face so that the eyes on a face are on a horizontal line.

The preprocessor 216 may also include a cropper 220 that crops the aligned image 214. The cropper 220 may remove non-ROI portions from the input image 214. For example, the cropper 220 may remove non-facial regions from the input image 214.

The preprocessor 216 may also include a scaler 222 that scales the input image 214 for comparison purposes. For instance, the scaler 222 may scale a facial region to a pre-defined size.

Additionally, the preprocessor 216 may include a histogram equalizer 224 to equalize or normalize the histogram of the input image 214. For example, the histogram equalizer 224 may overcome lighting variation in the input image 214.

The preprocessor 216 may output an ROI image 226. The ROI image 226 may include the ROI cropped from the input image 214 after being aligned and then scaled to a pre-defined size. An example preprocessing scenario using a face as the ROI is described below in connection with FIG. 9. In one configuration, the values of the pixels in the ROI image 226 maybe a modified version of the original input image 214 based on the ROI.

A feature extractor 228 may receive the ROI image 226 and may produce a feature vector 230. In one configuration, the feature extractor 228 may use Edge Histogram Descriptor (EHD) or a modified version of EHD (mEHD) to obtain a feature vector 230 for the input image 214. EHD may indicate edge distribution and mEHD may indicate a sign of edge distribution in an image 214.

In one configuration, the feature extractor 228 may produce directional gradient images based on the ROI image 226. A directional gradient image may be based on directional gradient components. In one configuration, the gradients in various directions (e.g., directional gradient components) of the ROI image 226 may be computed. This may be accomplished as described below in connection with FIG. 4.

For EHD, the feature extractor 228 may construct the feature vector 230 based on the magnitudes and signs in the directional gradient images. For example, the feature vector 230 may be computed by dividing each directional gradient image into cells and calculating the spatial histogram of the directional gradient components of the pixels in each cell. The cells may also be referred to as blocks, patches or sub-images. The subdivision of each directional gradient image can be either in cells of uniform non-overlapping grids, uniform overlapping grids, non-uniform non-overlapping grids or non-uniform overlapping grids. The number and type of cells may depend on the complexity of an expression detection application.

Edges in the cells may be determined based on the magnitude and sign of the directional gradient components. The edges in each cell may be classified into various types. For example, an edge may be classified as vertical, horizontal, 45-degree, 135-degree, or other orientation. The edges may also be classified as non-directional. A spatial histogram may be produced by counting the edges and non-edges in each cell. The EHD feature vector 230 may be constructed by combining the spatial histograms of each directional gradient image. An example of constructing a feature vector 230 according to EHD is discussed in connection with FIG. 4.

For mEHD, the feature extractor 228 may construct the feature vector 230 based on the signs in the directional gradient images. For example, the feature extractor 228 may combine the signs of the directional gradient components of the directional gradient images to produce combined signs for each pixel of the ROI image 226. The feature extractor 228 may then code each combined sign into a coded value. The coded values of the ROI image 226 may be divided into cells. A spatial histogram may be produced by counting each of the coded values in each cell. The mEHD feature vector 230 may be constructed from the spatial histogram. An example of constructing a feature vector 230 according to mEHD is discussed in connection with FIG. 6.

The use of EHD and mEHD may result in reduced computational complexity and a feature vector 230 of lower dimension as compared to feature vectors 230 produced by other methods (such as Principal Component Analysis (PCA) or Local Binary Patterns (LBP) or Histogram of Oriented Gradients (HOG)). In addition, mEHD may provide further reductions in the computational complexity as compared to EHD.

The classifier 232 may calculate an expression decision 248 based on the feature vector 230. The EHD or mEHD feature vectors 230 may be used in combination with a machine learning algorithm to determine, detect or calculate the deformable expression. For example, the classifier 232 may calculate an expression decision 248 that indicates the state of a deformable expression. The expression decision 248 may indicate smile/non-smile, blink/non-blink, angry/non-angry, running/non-running, etc.

The classifier 232 may use a machine learning algorithm to calculate the expression decision 248. Many machine learning algorithms are currently available. These machine learning algorithms include K-Nearest Neighbors (KNN), Support Vector Machines (SVM), boosting algorithms, decision trees, neural networks, etc. The machine learning algorithm may be trained using offline training data 240. In one configuration, the machine learning algorithm may be trained using database images to create a model based on the EHD or mEHD feature vectors 230 or a combination of both feature vectors 230.

In one implementation, KNN may compute the EHD or mEHD feature vector 230 of each image of each expression in a database of images and may store the feature vector 230 in a model. In another implementation, SVM may compute the maximum margin hyper-plane of the expression using the EHD or mEHD feature vectors 230 of each expression. The hyper-plane equation or support vectors may be stored to construct the model for classification. In yet another implementation, the boosting algorithm may build weak classifiers out of the computed EHD or mEHD feature vectors 230 for expression. The weak classifiers will construct the model for the boosting algorithm. Once a model is learned using a machine learning algorithm, the corresponding detection algorithm of the machine learning algorithm may be used to detect the deformable expression.

In one configuration, the classifier 232 may use a KNN algorithm to calculate the expression decision 248. To use the KNN algorithm, an image 214 or ROI image 226 may be classified by finding the minimum distance to the K nearest neighbors. The neighbors may be found from a learning database from EHD, mEHD or a combination of both types of feature vectors 230. Then, the closest distance of the EHD of mEHD feature vector 230 of the image 214 or ROI image 226 to the K-feature vectors in the database or model will determine the deformable expression (e.g., the expression decision 248).

In another configuration, the classifier 232 may use an SVM algorithm to calculate the expression decision 248. To use the SVM algorithm, a maximum margin hyper-plane in a higher dimensional space is found that separates two subsets of expression (e.g., smile/no-smile). The SVM algorithm can detect one or more classes from the learning database from EHD, mEHD or a combination of both types of feature vectors 230. The SVM algorithm may perform a query based on the feature vector 230. The deformable expression of an image 214 or ROI image 226 may be found as the distance of the computed EHD or mEHD feature vector 230 of the image 214 or ROI image 226 to a side of the hyper-plane.

In yet another configuration, the classifier 232 may use a boosting algorithm to calculate the expression decision 248. To use a boosting algorithm, an error is minimized between labels and model predictions. The boosting algorithm builds a cascade of weak classifiers where each weak classifier learns from the error probability of the previous weak classifier using a learning database from EHD, mEHD or a combination of both types of feature vectors 230. The deformable expression (e.g., expression decision 248) of the image 214 or ROI image 226 may be found by computing EHD or mEHD feature vector 230 of the image 214 or ROI image 226 and inputting feature vector 230 to the weak classifiers, which will then determine the deformable expression based on the probability (or likelihood) of the EHD or mEHD feature vector 230.

The deformable expression detector module 212 may also include a first feedback unit 234 and a second feedback unit 242. The first feedback unit 234 may update a classification error produced by the classifier 232. For example, a classification user interface 236 in the first feedback unit 234 may query the user or detect a misclassification of an expression based on deleted images 214. A classifier updater 238 may update the classifier 232 based on misclassification errors. In one example, if the expression decision 248 is incorrect (e.g., determined from input to the classification user interface 236 or an image 214 being deleted following classification), the classifier updater 238 may adjust the learned model used by the classifier 232 with the error image. The first feedback unit 234 is discussed in more detail in connection with FIG. 10.

The second feedback unit 242 may allow the user to adapt a decision threshold 246 of the classifier 232. Adapting the decision threshold 246 may adjust the likelihood that a particular expression will be found in an image 214. The second feedback unit 242 may include a decision threshold user interface 244 that may allow the user to change the decision threshold 246 used by the classification algorithm. Therefore, the decision threshold 246 may be shifted to fit a particular user. The second feedback unit 242 is discussed in more detail in connection with FIG. 11.

Figure 3:
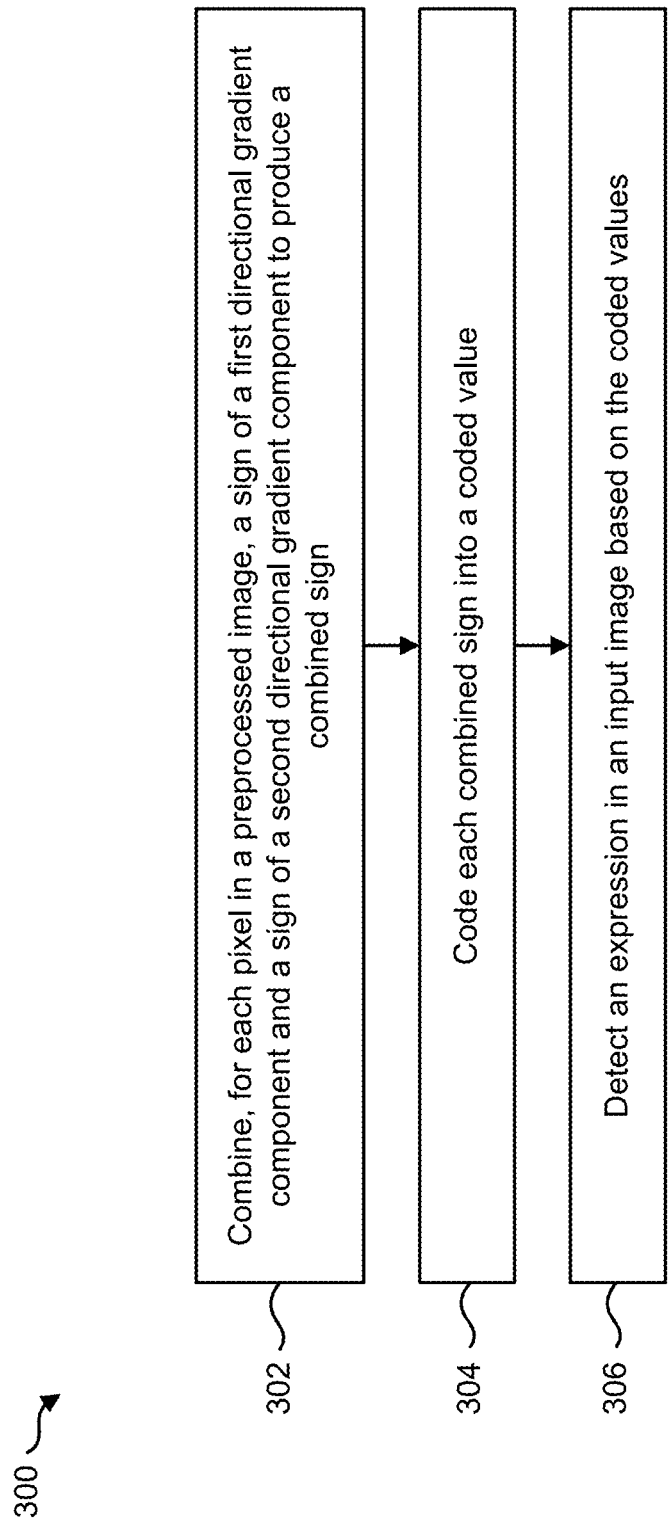
FIG. 3 is a flow diagram illustrating a method for deformable expression detection according a modified edge histogram descriptor (mEHD)

FIG. 3 is a flow diagram illustrating a method 300 for deformable expression detection according to mEHD. The method 300 may be implemented by an electronic device 102. In one configuration, the method 300 may be used for facial expression detection. For example, the expression may include actions such as smiling or blinking. The expression may also include emotions such as anger or sadness. In this configuration, the region of interest (ROI) is a face. However, this method 300 may be generalized for detection of any deformable expression with a certain ROI.

The electronic device 102 may produce a first directional gradient image and a second directional gradient image. A directional gradient image may be based on the directional gradient components associated with a particular direction. The directional gradient components of a directional gradient image may be determined based on an operator (e.g., a Sobel or Scharr operator). For example, an operator may be applied to each pixel in the ROI image 226 to compute the directional gradient components. In one configuration, the electronic device 102 may only determine the sign of the directional gradient components (not the magnitude). In another configuration both the magnitude and sign of the directional gradient components are computed.

The directional gradient components may be orthonormal. For example, the directional gradient components may be vertical and horizontal directional gradient components or 45 degree and 135 degree directional gradient components.

The electronic device 102 may combine 302, for each pixel in a preprocessed image, a sign of a first directional gradient component and a sign of a second directional gradient component to produce a combined sign. The preprocessed image may be an ROI image 226. The values of the directional gradient components of each pixel are either positive, negative or zero. In one implementation, the value of zero may be considered a positive value. Therefore, the sign of a directional gradient component may be positive or negative. The combined signs of the directional gradient components of each pixel can have four different combinations in this basis. The signs may be both positive (e.g., positive/positive or ++), both negative (e.g., negative/negative or −−), one positive and the other negative (e.g., positive/negative or +−) and one negative and the other positive (e.g., negative/positive or −+).

The electronic device 102 may code 304 each of the combined signs into a coded value. For example, each of the different combinations of combined signs may have a different coded value. Therefore, a combined sign may be translated into a particular coded value (e.g., code). In one configuration, coding 304 may include coding each pixel based on the signs of the directional gradient components without determining the value of the magnitude of the directional gradient components.

The electronic device 102 may detect 306 an expression in an input image 214 based on the coded values. For example, the coded values of the ROI image 226 may be divided into cells. A spatial histogram may be produced by counting each of the coded values in each cell. A feature vector 230 may be constructed from the spatial histogram. The electronic device 102 may then classify the feature vector 230 using a machine learning algorithm. The machine learning algorithm may be an SVM algorithm, a boosting algorithm or a KNN algorithm.

Figure 4:
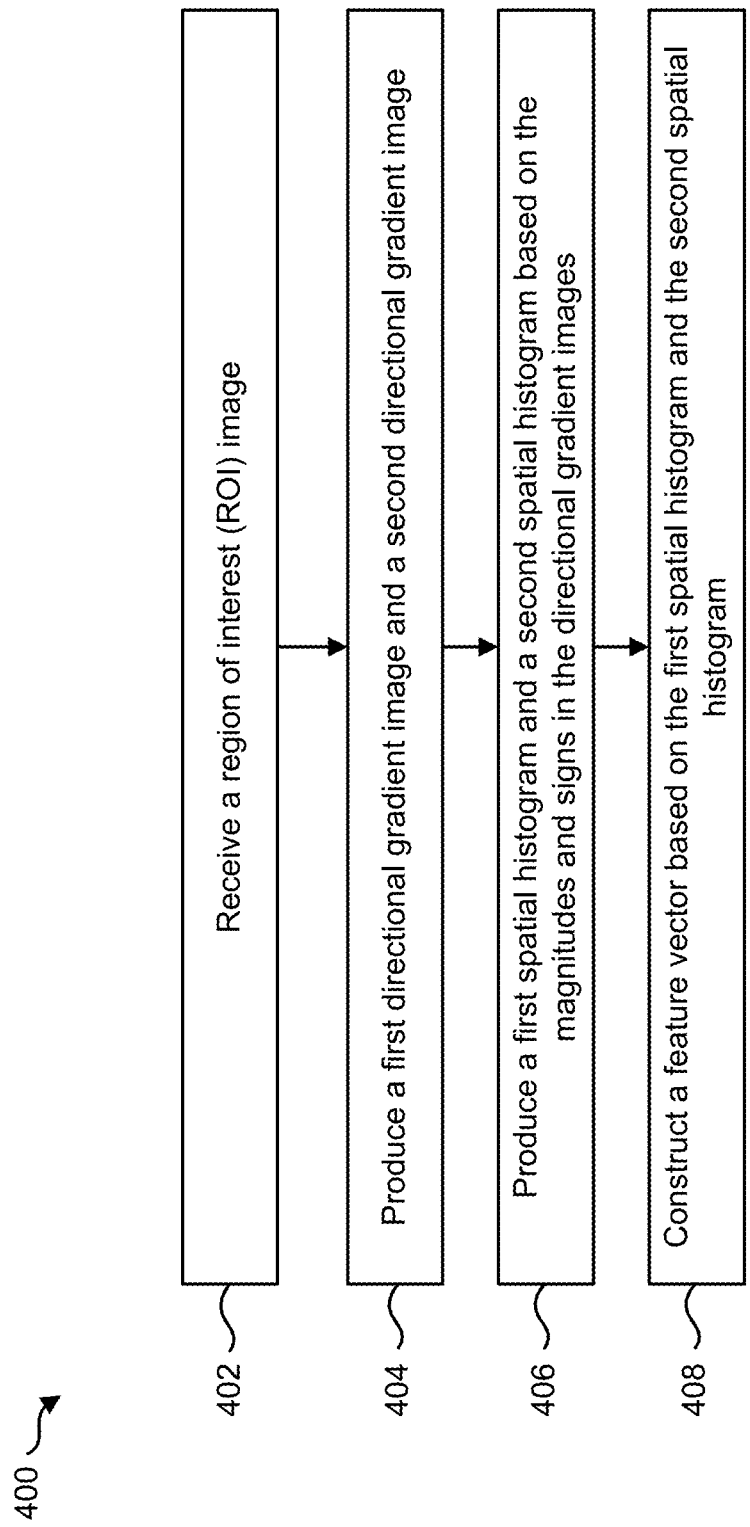
FIG. 4 is a flow diagram illustrating a method for constructing a feature vector according to an edge histogram descriptor (EHD)

FIG. 4 is a flow diagram illustrating a method 400 for constructing a feature vector 230 according to EHD. The method 400 may be implemented by an electronic device 102. In one configuration, the method 400 may be used for facial expression detection. In this configuration, the region of interest (ROI) is a face. However, this method 400 may be generalized for detection of any deformable expression with a certain ROI. Therefore, the steps in the flow diagram illustrated in FIG. 4 describe a general implementation of EHD for extracting a feature vector 230.

The electronic device 102 may receive 402 an ROI image 226. In one configuration, the ROI image 226 may be obtained upon preprocessing an input image 214. This may be accomplished as described above in connection with FIG. 2.

The electronic device 102 may produce 404 a first directional gradient image and a second directional gradient image. A directional gradient image may be based on directional gradient components. In one configuration, the gradients in various directions (e.g., directional gradient components of an image 214 or an ROI image 226) may be computed. This can be done using various operators. Some example operators include Sobel, Prewitt, Scharr or other finite differences operators. Furthermore, the operators may be linear or non-linear operators. These operators may also be referred to as kernels or filters. Any of these operators (or any operator that may invoke computing derivatives) may be used to calculate the directional gradients for EHD or mEHD. The directional gradient components produced by an operator may include vertical, horizontal, 45-degree, 135-degree or any other direction. In some configurations, an operator may be a matrix that includes various elements. Therefore, a directional gradient component may be the output of a convolution of an image (e.g., ROI image 226) and an operator (e.g., Sobel operator) corresponding to a particular direction.

In one example, the directional gradient components may include horizontal directional gradient components ($G_h$) and vertical directional gradient components ($G_v$). The horizontal directional gradient component ($G_h$) for each pixel in the ROI image 226 may be computed by applying a horizontal Sobel operator on the ROI image 226, as shown in Equation (1). The vertical directional gradient component ($G_v$) for each pixel in the ROI image 226 may be computed by applying a vertical Sobel operator on the ROI image 226, as shown in Equation (2).

$$G_h = \begin{bmatrix} -\frac{1}{8} & 0 & \frac{1}{8} \\ -\frac{2}{8} & 0 & \frac{2}{8} \\ -\frac{1}{8} & 0 & \frac{1}{8} \end{bmatrix} * I \quad (1)$$

$$G_v = \begin{bmatrix} -\frac{1}{8} & -\frac{2}{8} & -\frac{1}{8} \\ 0 & 0 & 0 \\ \frac{1}{8} & \frac{2}{8} & \frac{1}{8} \end{bmatrix} * I \quad (2)$$

In Equation (1) and Equation (2), the variable I is the ROI image 226 under consideration, "*" is a convolution operator and the matrix is the operator (e.g., Sobel operator). In Equation (1) and Equation (2), the convolution may be performed by sliding the operator over the ROI image 226. Each operator position may produce a corresponding directional gradient component for a pixel in the ROI image 226. Therefore, based on Equation (1) and Equation (2), each pixel in the ROI image 226 has two directional gradient components. For instance, a pixel has a horizontal directional gradient component ($G_h$) and a vertical directional gradient component ($G_v$).

The value of a directional gradient component may be calculated based on the convolution operation. For example, the value of a directional gradient component may be calculated by multiplying the operator value and the underlying ROI image pixel 226 value for each element of the operator and then adding these results together. The value of a directional gradient component has a certain magnitude and sign, as determined by the convolution.

Figure 5:
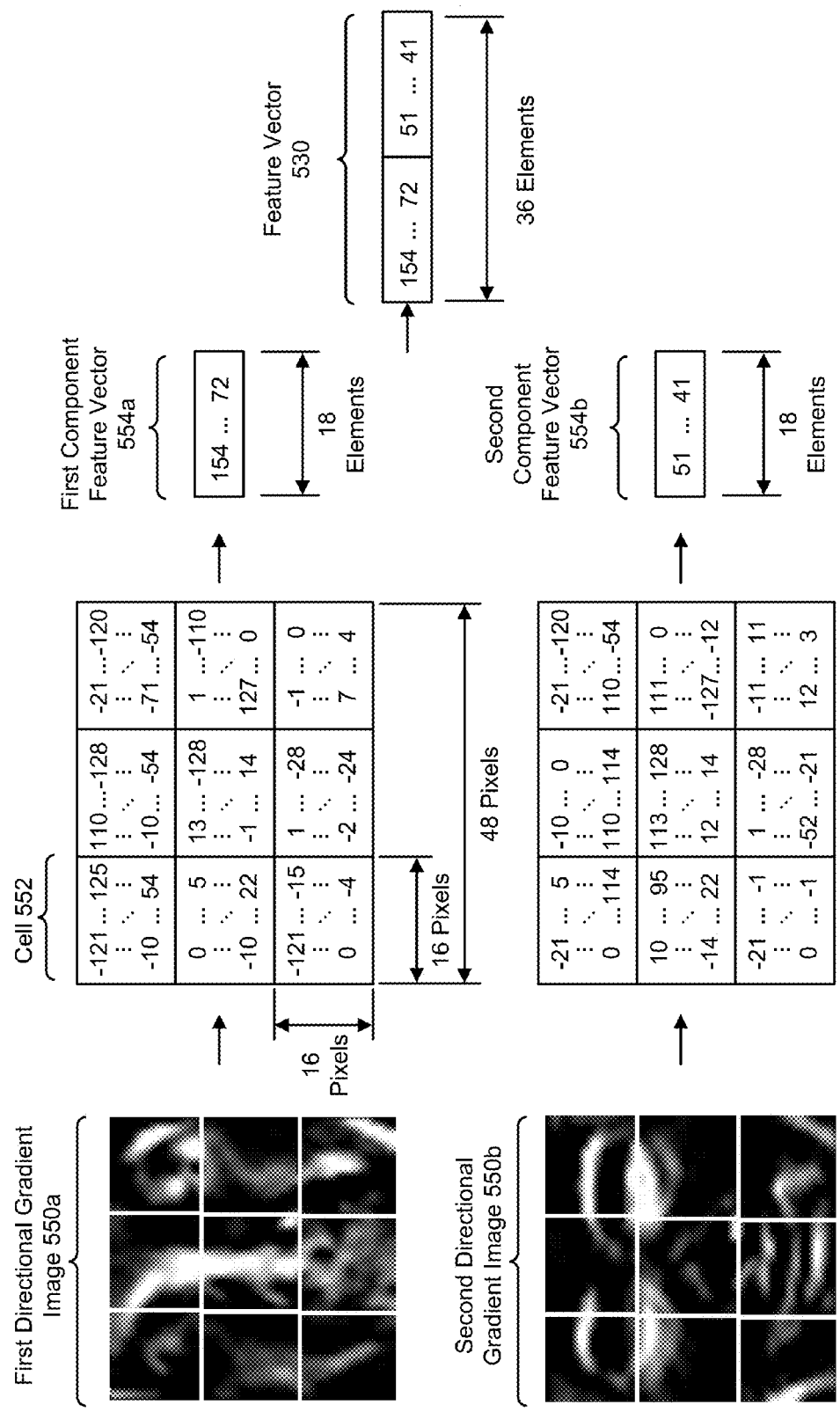
FIG. 5 is a diagram illustrating an example of calculating a feature vector according to EHD.

A directional gradient image may be composed of the directional gradient components associated with a particular direction. An example of the resulting directional gradient images for two directions (e.g., horizontal and vertical) is illustrated in FIG. 5. Other directional gradient images (e.g., 45-degree, 135-degree, etc.) may also be computed for EHD, if needed. Depending on the deformable expression under consideration, computing more directional gradients may increase the accuracy of the detection. Each directional gradient component of a directional gradient image may indicate the change in intensity at the same point in the original ROI image 226 in the direction associated with the directional gradient component.

The electronic device 102 may produce 406 a first spatial histogram and a second spatial histogram based on the magnitudes and signs in the directional gradient images. A directional gradient image may be divided into cells by dividing the directional gradient image into a grid. The edges in each cell may be classified into various types. For example, an edge may be classified as vertical, horizontal, 45-degree, 135-degree, or other orientation. The edges may also be classified as non-directional.

A spatial histogram in EHD may be produced 406 by counting the edge type in each cell of a directional gradient image. For example, the values of each directional gradient component may be quantized into two bins. For instance, a directional gradient component may be classified as an edge or a non-edge depending on whether the magnitude of the directional gradient component is greater than a predefined threshold. For EHD, the strength of an edge may be determined based on the gradient magnitude. The spatial histogram may include the number of edges and non-edges in each cell. The spatial histogram for each directional gradient component may be expressed as a vector (e.g., a component feature vector).

In the example where the directional gradient components include horizontal directional gradient components ($G_h$) and vertical directional gradient components ($G_v$), the first spatial histogram may indicate the number of horizontal edges and non-edges in each cell. The values of the first spatial histogram may be included in a first component feature vector. Therefore, the first component feature vector may include the number of horizontal edges and non-horizontal edges in each cell of the first gradient image. The second spatial histogram may indicate the number of vertical edges in each cell. The values of the second spatial histogram may be included in a second component feature vector. Therefore, the second component feature vector may include the number of vertical edges and non-vertical edges in each cell of the second gradient image.

The electronic device 102 may construct 408 a feature vector 230 based on the first spatial histogram and the second spatial histogram. For example, the first component feature vector and the second component feature vector may be concatenated or combined to obtain the feature vector 230. The dimension of the feature vector 230 is related to the number of cells C of the spatial histogram, the number of directional gradient components D used and the number of the quantization levels Q of the gradient values (e.g., C×D×Q).

In one configuration, the values computed in EHD may be normalized. For example, the normalization can be performed by dividing the values of the feature vector 230 by the total size of a cell over which the spatial histogram is computed. The normalization may make the final values of the feature vector 230 between 0 and 1. This normalization step could be beneficial for some machine learning algorithms such as Support Vector Machines (SVM).

It should be noted that in the systems and methods described herein, the whole directional gradients notation (e.g., the sign and magnitude of the directional gradient components) can be used to construct the EHD feature vector 230. Therefore, the spatial histogram(s) used to construct the EHD feature vector 230 should take into account all the gradient information (e.g., the sign and magnitude of the directional gradient components).

FIG. 5 is a diagram illustrating an example of calculating a feature vector 530 according to EHD. In this example, a first directional gradient image 550a and a second directional gradient image 550b are produced from a ROI image 226. The size of the ROI image 226 is 48 pixels by 48 pixels (e.g., 48×48). A first directional gradient component is a horizontal directional gradient component ($G_h$). A second directional gradient component is a vertical directional gradient component ($G_v$).

The directional gradient images 550 may be produced by applying operators to the ROI image 226. For example, a convolution operation may produce directional gradient components corresponding to a particular direction. This may be accomplished as described above in connection with FIG. 4. In this example, the first directional gradient image 550a corresponds to horizontal directional gradient components ($G_h$). The second directional gradient image 550b corresponds to vertical directional gradient components ($G_v$). The directional gradient images 550 are each 48×48 pixels. Each directional gradient component in a directional gradient image 550 may have a value between −127 to 127.

To produce spatial histograms, each directional gradient image 550 may be divided into cells 552. In this example, the directional gradient images 550 are divided into nine non-overlapping cells 552 in a 3×3 grid. Each cell 552 has a size of 16×16 pixels.

The spatial histograms may be produced by counting the edge type in each cell 552 of a directional gradient image 550. For example, the values of each directional gradient component in a directional gradient image 550 may be quantized into two bins (e.g., 2 quantization levels). For instance, a directional gradient component may be an edge or a non-edge depending on whether the magnitude of the directional gradient component is greater than a predefined threshold. The spatial histogram may include the number of edges and non-edges in each cell 552.

The values of a spatial histogram may be included in a component feature vector 554. The dimension of a component feature vector 554 is based on the number of cells C of the spatial histogram and the number of the quantization levels Q. In this example, there are nine cells 552 and two quantization levels (e.g., edge or non-edge). Therefore, the dimension of the component feature vectors 554 is 9×2=18. In other words, the component feature vectors 554 in this example each include 18 elements.

In this example, the values of the first spatial histogram may be included in a first component feature vector 554a. Therefore, the first component feature vector 554a may include the number of horizontal edges and non-horizontal edges in each cell 552 of the first gradient image 550a. The second spatial histogram may indicate the number of vertical edges in each cell 552. The values of the second spatial histogram may be included in a second component feature vector 554b. Therefore, the second component feature vector 554b may include the number of vertical edges and non-vertical edges in each cell 552 of the second gradient image 550b.

As discussed above, the dimension of the feature vector 530 for EHD is related to the number of cells C of the spatial histogram, the number of directional gradient components D used and the number of the quantization levels Q (e.g., C×D×Q). In this example there are nine cells 552, two directional gradient components (e.g., $G_h$ and $G_v$) and two quantization levels. Therefore, the dimension of the feature vector 530 is 9×2×2=36. In other words, the feature vector 530 in this example includes 36 elements. It should be noted that the values indicated in the example discussed in connection with FIG. 5 are illustrative and may vary in accordance with the described systems and methods.

In one configuration, the values computed in EHD may be normalized. For example, the normalization can be performed by dividing the values of the feature vector 530 by the total size of a cell 552 over which a spatial histogram is computed. In this example, the values of the feature vector 530 may be divided by the size of the cell 552 (e.g., 256=16×16) to ensure that the final values of the feature vector 530 are between 0 and 1.

Figure 6:
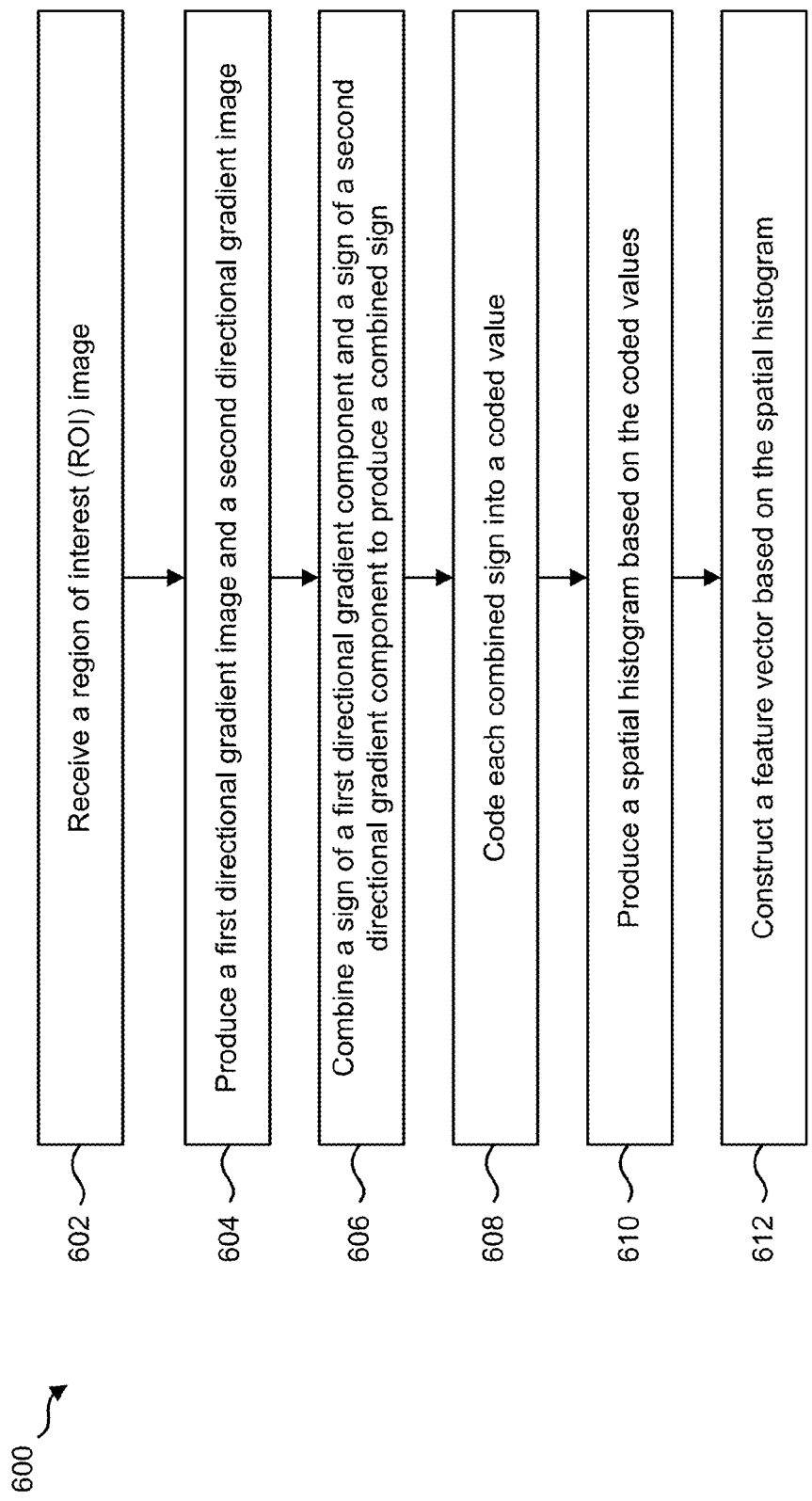
FIG. 6 is a flow diagram illustrating a method for constructing a feature vector according to a modified edge histogram descriptor (mEHD)

FIG. 6 is a flow diagram illustrating a method 600 for extracting a feature vector 230 according to mEHD. The method 600 may be implemented by an electronic device 102. In one configuration, the method 600 may be used for facial expression detection. In this configuration, the region of interest (ROI) is a face. However, this method 600 may be generalized for detection of any deformable expression with a certain ROI. Therefore, the steps in the flow diagram illustrated in FIG. 6 describe a general implementation of EHD for extracting a feature vector 230.

A feature vector 230 based on EHD may be simpler to compute as compared to other known solutions because EHD invokes gradient computations as opposed to singular value decompositions (as in PCA) or interpolation (as in LBP). However, electronic devices 102 such as mobile devices may benefit from further low-cost features in order to save resources and reduce power consumption. Therefore, the present systems and methods describe a modified EHD (mEHD), which may reduce the computations of EHD and is hardware-friendly.

The electronic device 102 may receive 602 an ROI image 226. In one configuration, the ROI image 226 may be obtained upon preprocessing an input image 214 as described above in connection with FIG. 2.

The electronic device 102 may produce 604 a first directional gradient image and a second directional gradient image. This may be accomplished as described above in connection with FIG. 4. A directional gradient image may be based on the directional gradient components associated with a particular direction.

The directional gradient components may be orthonormal and may define an orthonormal basis. One example of an orthonormal basis is the Sobel operator and its transpose, as shown above in Equations (1) and (2). Therefore, in one configuration, the directional gradient components may be vertical and horizontal directional gradient components. In another configuration, the directional gradient components may be 45-degree and 135-degree directional gradient components. It should be noted that any orthonormal basis may be used.

In one example, the directional gradient components may include horizontal directional gradient components ($G_h$) and vertical directional gradient components ($G_v$). In this example, $G_h$ and $G_v$ form an orthonormal basis and may be used to produce 604 a first directional gradient image and a second directional gradient image.

Figure 8:
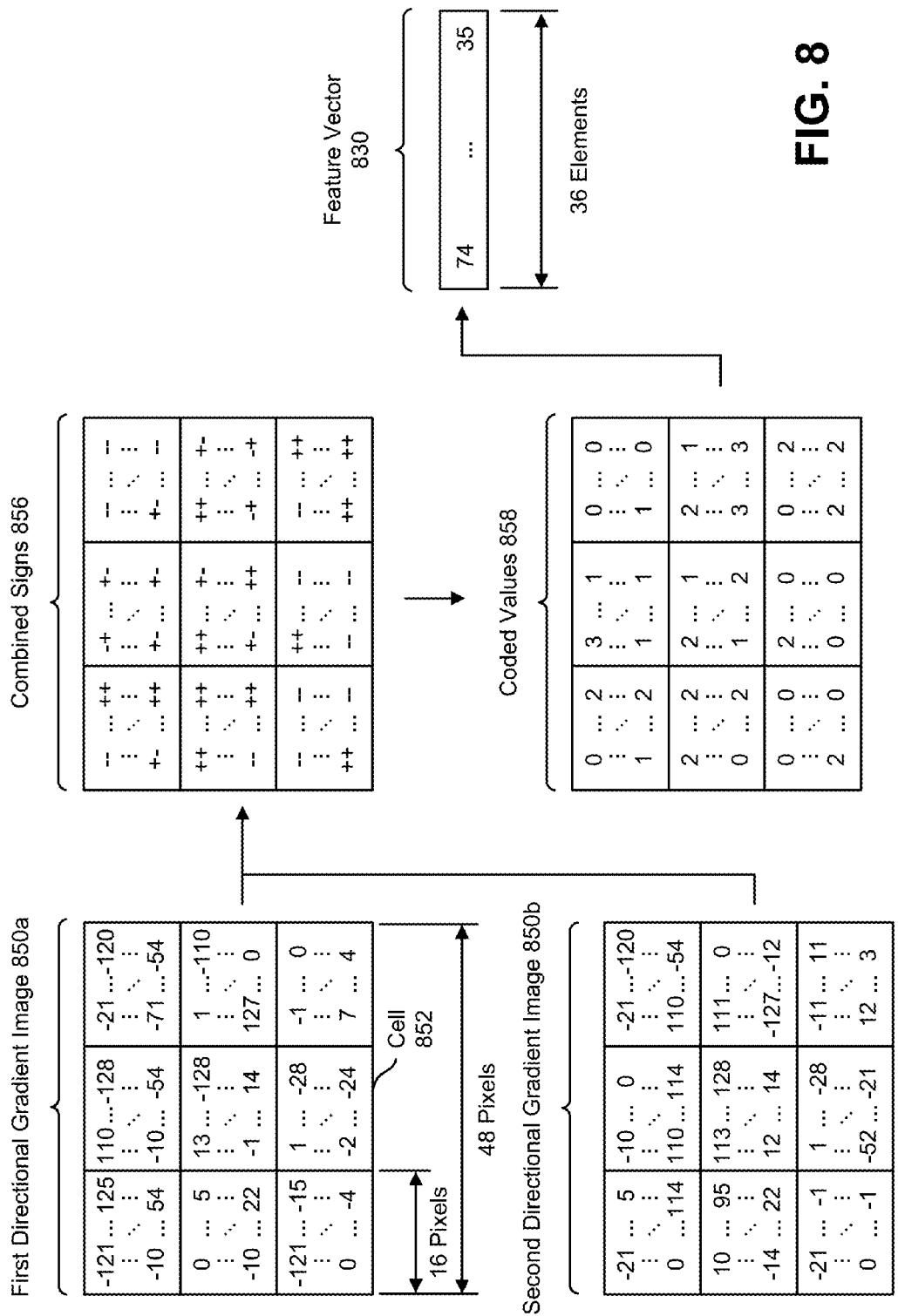
FIG. 8 is a diagram illustrating an example of calculating a feature vector according to mEHD.

A directional gradient image may be composed of the directional gradient components associated with a particular direction. An example illustrating the resulting pixel values (e.g., directional gradient component values) of the directional gradient images for two directions (e.g., horizontal and vertical) is illustrated in FIG. 8.

The electronic device 102 may combine 606 a sign of a first directional gradient component and a sign of a second directional gradient component to produce a combined sign. With mEHD, instead of accounting for the full directional gradient values (e.g., the magnitude and signs of the directional gradient components), only the signs of at least two directional gradient components are considered to construct the feature vector 230. Furthermore, mEHD is insensitive to how the edges are calculated, as compared to other known feature descriptor solutions that may fail if edges are computed via Sobel or Scharr operators. For instance, the Sobel and Scharr operators approximate rotation invariance, which is problematic for other known feature descriptor solutions.

The values of the directional gradient components of each pixel are either positive, negative or zero. In one implementation, the value of zero may be considered a positive value. Therefore, the sign of a directional gradient component may be positive or negative. The combined signs of the directional gradient components of each pixel can have four different combinations in this basis. The signs may be both positive (e.g., positive/positive or ++), both negative (e.g., negative/negative or −−), one positive and the other negative (e.g., positive/negative or +−) and one negative and the other positive (e.g., negative/positive or −+).

The electronic device 102 may code 608 each combined sign into a coded value. The maximum number of the coded values may depend on the number of directional gradient components used. The maximum number of coded values M may be determined as $M=2^D$, where D is the number of directional gradient components used. In the example where the directional gradient components include horizontal directional gradient components ($G_h$) and vertical directional gradient components ($G_v$), two directional gradients are used (e.g., D=2), and the maximum number of coded values for a combined sign is 4. In other words, a combined sign in this example may be coded 608 into one of four different coded values.

The electronic device 102 may produce 610 a spatial histogram based on the coded values. In one configuration, the spatial histogram may be produced 610 by dividing the coded values of each pixel in the ROI image 226 into a grid of cells. In one example, the coded values of each pixel in the ROI image 226 may be divided into nine non-overlapping cells in a 3×3 grid. The spatial histogram may be produced 610 by counting the number (e.g., occurrence) of each coded value in a cell.

The electronic device 102 may construct 612 a feature vector 230 based on the spatial histogram. The feature vector 230 may include the values of the spatial histogram. Therefore, the feature vector 230 may include the number (e.g., occurrence) of each coded value in each cell of the spatial histogram. The dimension of the feature vector 230 based on mEHD is related to the number of cells C of the spatial histogram and the number of coded values M used. (e.g., C×M). A more detailed example of constructing 612 the feature vector 230 based on mEHD is discussed in connection with FIG. 8.

In one configuration, the values computed in mEHD may be normalized. For example, the normalization can be performed by dividing the values of the feature vector 230 by the total size of a cell over which the spatial histogram is computed. The normalization may make the final values of the feature vector 230 between 0 and 1.

It should be noted that the mEHD feature vector 230 may be constructed from the two basis images directly and at the same time. However, in EHD (described above in connection with FIG. 4 and FIG. 5), each directional gradient component is treated independently. Furthermore, with mEHD, the sign of the direction may be used when coded to construct the mEHD feature vector 230. The spatial histogram should use the signs (or the coded signs) of the directional gradient components to construct the spatial histogram values included in the mEHD feature vector 230.

Figure 7:
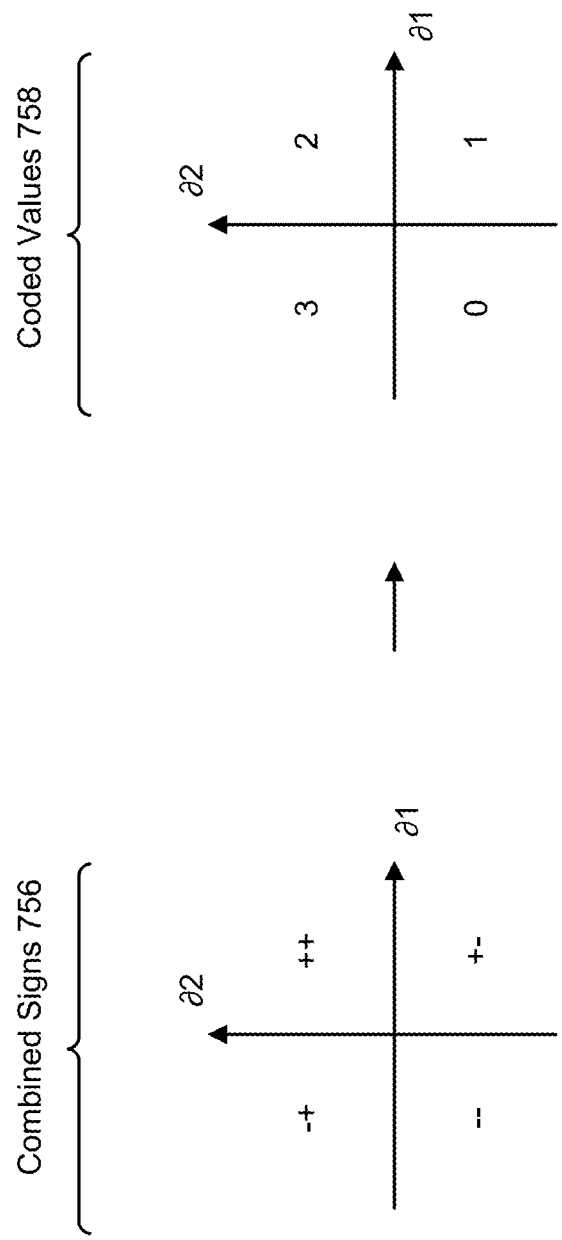
FIG. 7 is a diagram illustrating an example of coding the combined signs of directional gradient components.

FIG. 7 is a diagram illustrating an example of coding the combined signs 756 of directional gradient components. In FIG. 7, ∂1 and ∂2 are directional derivatives. Furthermore, ∂1 and ∂2 are the axes defined by a first directional gradient component ($G_1$) and a second directional gradient component ($G_2$). In one configuration, the ∂1 and ∂2 may define an orthonormal basis. For example, ∂1 may correspond to a horizontal directional gradient component ($G_h$) and ∂2 may correspond to a vertical directional gradient component ($G_v$). In this example, ∂1 may be expressed as ∂h and ∂2 may be expressed as ∂v.

Each pixel in $G_1$ and $G_2$ (and consequently in ∂1 and ∂2) may be either positive, negative or zero. In one implementation, the value of zero may be considered a positive value. In the example illustrated in FIG. 7, the combined signs 756 of the directional gradient components in $G_1$ and $G_2$ defining the basis are used for a two-dimensional problem. Therefore, the combined signs 756 of the directional gradient components of each pixel can have four different combinations in this basis. The signs may be both positive (e.g., positive/positive or ++), both negative (e.g., negative/negative or −−), one positive and the other negative (e.g., positive/negative or +−) and one negative and the other positive (e.g., negative/positive or −+). The combined signs 756 may be used so that a classifier 232 can detect a deformable expression by finding the sign variations or patterns according to mEHD.

The combined signs 756 may be coded into four different coded values 758. In the configuration illustrated in FIG. 7, negative/negative may be coded to 0, positive/negative may be coded to 1, positive/positive may be coded to 2 and negative/positive may be coded to 3.

The number of coded values 758 may depend on the number of directional derivatives used. The mEHD feature vector 230 (e.g., mEHD descriptor) may be constructed using only two directional derivatives in two dimensions. The concept can be extended to more than two directional derivatives. In that case, more than four coded values 758 may be used. The number of coded values 758 needed depends on the number of the directional derivatives used. For two directional derivatives, $2^2=4$ coded values 758 are needed. For L directional derivatives where L≥2, $2^L$ coded values 758 are needed.

A 2-dimensional graph is illustrated in FIG. 7, but the systems and methods described herein may also be extended to N-dimensions. Therefore, the mEHD feature vector 230 may be extended to N-Dimensional. One example is to include time as in a video sequence. Another example is to use more directional gradients. The maximum number of coded values 758 will still depend on the number of directional gradient components (and corresponding directional derivatives) used.

As an extension to mEHD, it is possible to not use all the coded values 758. In one configuration, only two out of the four coded values 758 may be used. Each two anti-diagonal signs (e.g., ++& −− or +− & −+) complement each other. Depending on the complexity of the expression detection, two coded values 758 may be sufficient to describe a sign pattern. For instance, either ++& +− or ++& −+ or −− & +− or −− & −+ may be sufficient to describe the sign pattern.

FIG. 8 is a diagram illustrating an example of calculating a feature vector 830 according to mEHD. In this example, a first directional gradient image 850$a$ and a second directional gradient image 850$b$ are produced from an ROI image 226. This may be accomplished as described above in connection with FIG. 6. The pixel values (e.g., directional gradient component values) of the directional gradient images 850 are illustrated in FIG. 8.

In this example, the size of the ROI image 226 is 48 pixels by 48 pixels (e.g., 48×48). The first directional gradient image 850$a$ corresponds to a horizontal directional gradient component ($G_h$). The second directional gradient image 850$b$ corresponds to a vertical directional gradient component ($G_v$). The directional gradient images 850 are each 48×48 pixels. In this example, the magnitudes of the directional gradient components are computed. Each directional gradient component in a directional gradient image 850 may have a value between −127 to 127. This may be accomplished based on a Sobel operator, as discussed above in connection with FIG. 6. It should be noted, however, that in other configurations only the signs (not the magnitude) of each directional gradient component may be determined.

The signs of the directional gradient images 850 may be combined to produce a combined sign 856 for each pixel of the ROI image 226. For example, the sign of the first directional gradient component and a sign of a second directional gradient component may be combined to produce a combined sign 856. The values of the directional gradient components of each pixel are either positive, negative or zero. In one implementation, the value of zero may be considered a positive value. The combined signs 856 of the directional gradient components of each pixel can have four different combinations in this basis. The signs may be both positive (e.g., positive/positive or ++), both negative (e.g., negative/negative or −−), one positive and the other negative (e.g., positive/negative or +−) and one negative and the other positive (e.g., negative/positive or −+).

The combined signs 856 may be coded into coded values 858. This may be accomplished as described above in connection with FIG. 7. In this example, two directional gradient components are used. Therefore, for each combined sign 856, the maximum number of coded values 858 is four. In other words, a combined sign 856 may be coded with one of four different coded values 858.

A feature vector 830 may be produced based on a spatial histogram. In this example, the spatial histogram may be produced by dividing the coded values 858 of each pixel in the ROI image 226 into a grid of non-overlapping cells 852. The coded values 858 are divided into nine cells 852 in a 3×3 grid. In this case, each cell 852 has a size 16×16. The spatial histogram may be produced by counting the number (e.g., occurrence) of each coded value in a cell 852.

The feature vector 830 may include the number (e.g., occurrence) of each coded value in each cell 852 of the spatial histogram. The dimension of the feature vector 830 based on mEHD is related to the number of cells C of the spatial histogram and the number of coded values M used. (e.g., C×M). In this example, the number of cells C is 9 and the number of coded values M used is 4. Therefore, the dimension of the feature vector 830 is 9×4=36.

In one configuration, the values computed in mEHD may be normalized. For example, the normalization can be performed by dividing the values of the feature vector 230 by the total size of a cell 852 over which the spatial histogram is computed. In this example, the size of the cell 852 is 16×16=256. The normalization may make the final values of the feature vector 230 between 0 and 1.

Figure 9:
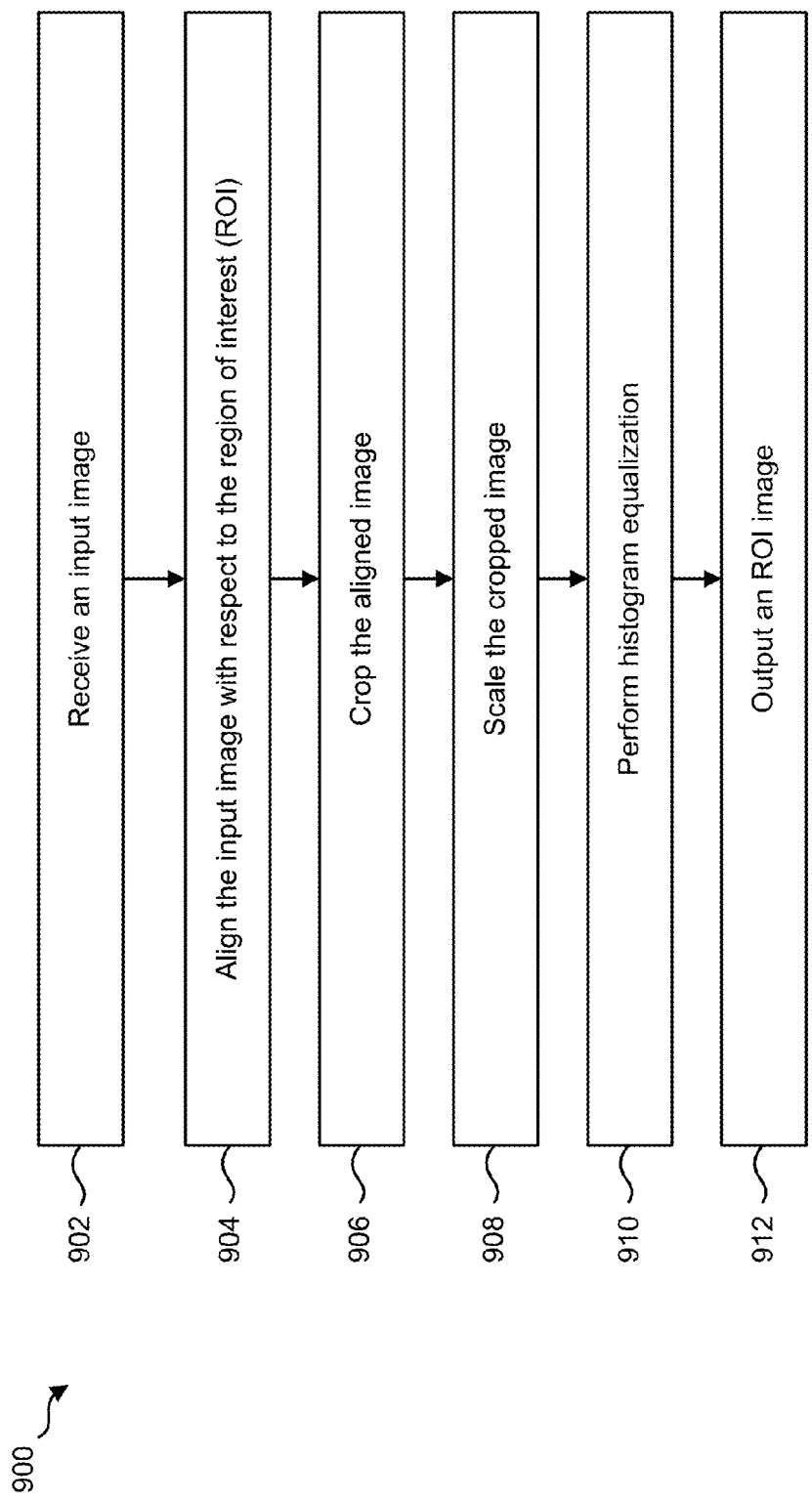
FIG. 9 is a flow diagram illustrating a method for preprocessing an image.

FIG. 9 is a flow diagram illustrating a method 900 for preprocessing an image 214. The method 900 may be performed by an electronic device 102. In one configuration, the method 900 may be performed for facial expression detection. Therefore, the region of interest (ROI) is a face. However, the present systems and methods may be generalized to any deformable expression with a certain ROI.

The electronic device 102 may receive 902 an input image 214. The image 214 may be received 902 from a camera (e.g., an image sensor 104 and an optical system 106). The image 214 may also be received 902 from memory.

The electronic device 102 may align 904 the input image 214 with respect to the ROI. For example, the electronic device 102 may align the face so that the eyes on a face are on a horizontal line.

The electronic device 102 may crop 906 the aligned image 214. For example, the electronic device 102 may remove non-ROI portions from the input image 214. In the case of facial expression detection, the electronic device 102 may remove non-facial regions from the input image 214.

The electronic device 102 may scale 908 the cropped image 214. The input image 214 may be scaled 908 for comparison purposes. For example, the electronic device 102 may scale 908 a facial region to a pre-defined size.

The electronic device 102 may perform 910 histogram equalization. The histogram equalization may be performed 910 to equalize or normalize the histogram of the input image 214. For example, the electronic device 102 may overcome lighting variation in the input image 214.

The electronic device 102 may output 912 an ROI image 226. The ROI image 226 may include the ROI cropped from the input image 214 that is aligned, scaled to a pre-defined size and equalized.

It should be noted that the steps of the method 900 illustrated in FIG. 9 may be interchanged. Moreover, some steps may be added or removed depending on the accuracy or complexity that a user can tolerate. For example, histogram equalization may be dropped in some configurations of this method 900. Furthermore, alignment based on an ROI may also be dropped. In fact, all of the pre-processing steps may be removed as a special configuration for deformable expression detection.

Figure 10:
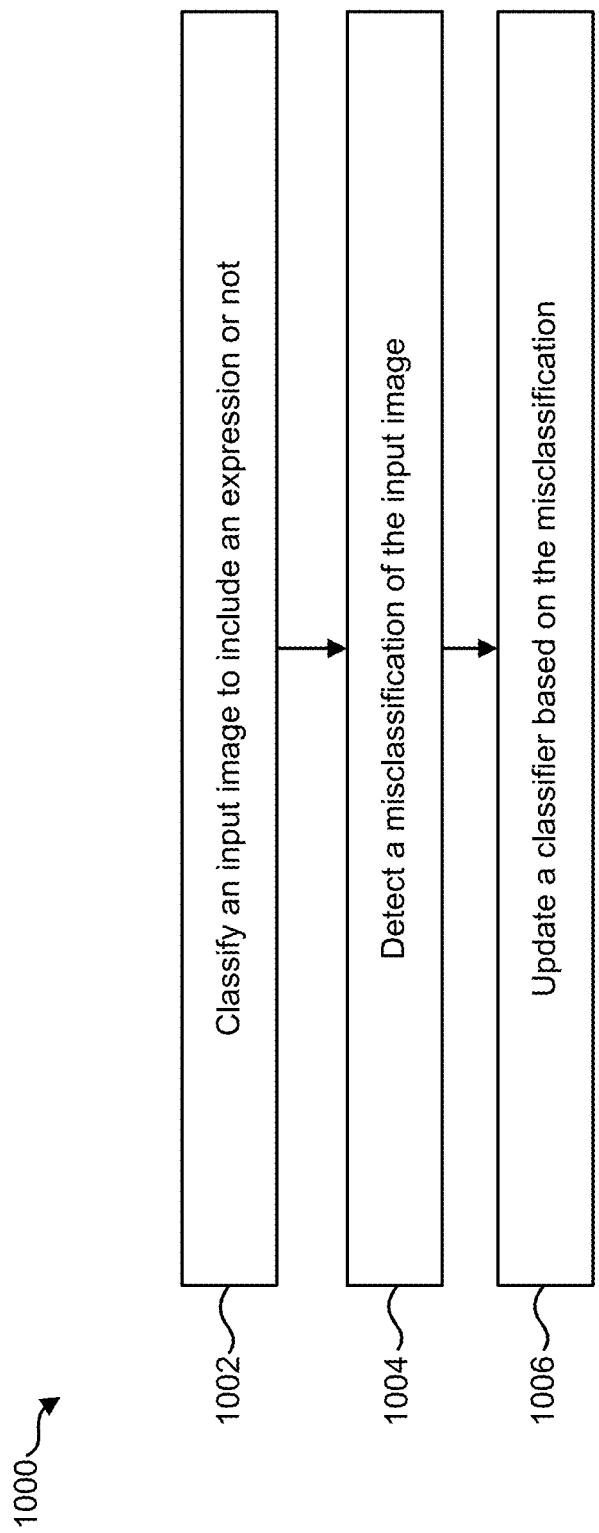
FIG. 10 is a flow diagram illustrating a method for updating a classification error.

FIG. 10 is a flow diagram illustrating a method 1000 for updating a classification error. The method 1000 may be performed by an electronic device 102. In one configuration, the method 1000 may be performed by a first feedback unit 234 in an electronic device 102. The electronic device 102 may classify 1002 an input image 214 to include an expression or not. In one scenario, the electronic device 102 may determine whether a face in the input image includes a particular expression or not. Examples of expressions include smiling, closing eyes, anger, running, etc.

The electronic device 102 may detect 1004 a misclassification of the input image 214. For example, a smile may be incorrectly detected or a classification that eyes are shut may be determined when the eyes are actually open. Detecting 1004 a misclassification may include using a classification user interface 236 in an application that uses a camera.

In one configuration, the classification user interface 236 may detect 1004 a misclassification of the input image 214 (e.g., falsely detected expressions) by asking the user about the accuracy of the classification. After a picture (e.g., input image 214) is taken and an expression decision 248 is determined, the classification user interface 236 may present the input image 214 and the classification (e.g., the expression decision 248) to the user. The classification user interface 236 may ask the user if the classification is correct. The classification user interface 236 may ask the user to verify the accuracy of the classification in fixed intervals (e.g., for each classification, every other classification, every third classification, etc.) or randomly. The user may then have the opportunity to verify that the classification is correct or identify a misclassification.

In another configuration, a misclassification may be inferred from the deletion of an image 214 by the user. For example, if the classification of the image 214 was incorrect, the user may delete the image 214. The classification user interface 236 may identify the classification that corresponds to the deleted image as a misclassification. In this way, the classification user interface 236 may learn about classification mistakes.

The electronic device 102 may update 1006 the classifier 232 based on the misclassification. The update 1006 to the classifier 232 may depend on the type of classifier 232 used. As an example, K-Nearest Neighbors (KNN) classifiers 232 may use the shortest distances of image 214 or ROI image 226 to K-elements of the learning database. Support Vector Machine (SVM) classifiers 232 may find the hyper-plane (H) separating two subsets (e.g., smile/no-smile, run/no-run), then the query is found as the distance to a side of H. Boosting (e.g., Gentle Boost) classifiers 232 may use iterative learning weak classifiers 232 with respect to a distribution and add them to make a final strong classifier 232.

In one example, if SVM is used, updating 1006 may include updating support vectors of the hyper-plane using the new EHD or mEHD feature vector 230 of the error image 214 or error ROI image 226 (e.g., the image 214 or ROI image 226 corresponding to a misclassification). If KNN is used, updating 1006 may include adding the feature vector 230 of the new EHD or mEHD feature vector 230 of the image 214 or ROI image 226 to a database. If a boosting algorithm (e.g., Gentle Boost) is used, updating 1006 may include updating classifiers 232 with the EHD or mEHD feature vector 230 of the error image 214 or the error ROI image 226.

Figure 11:
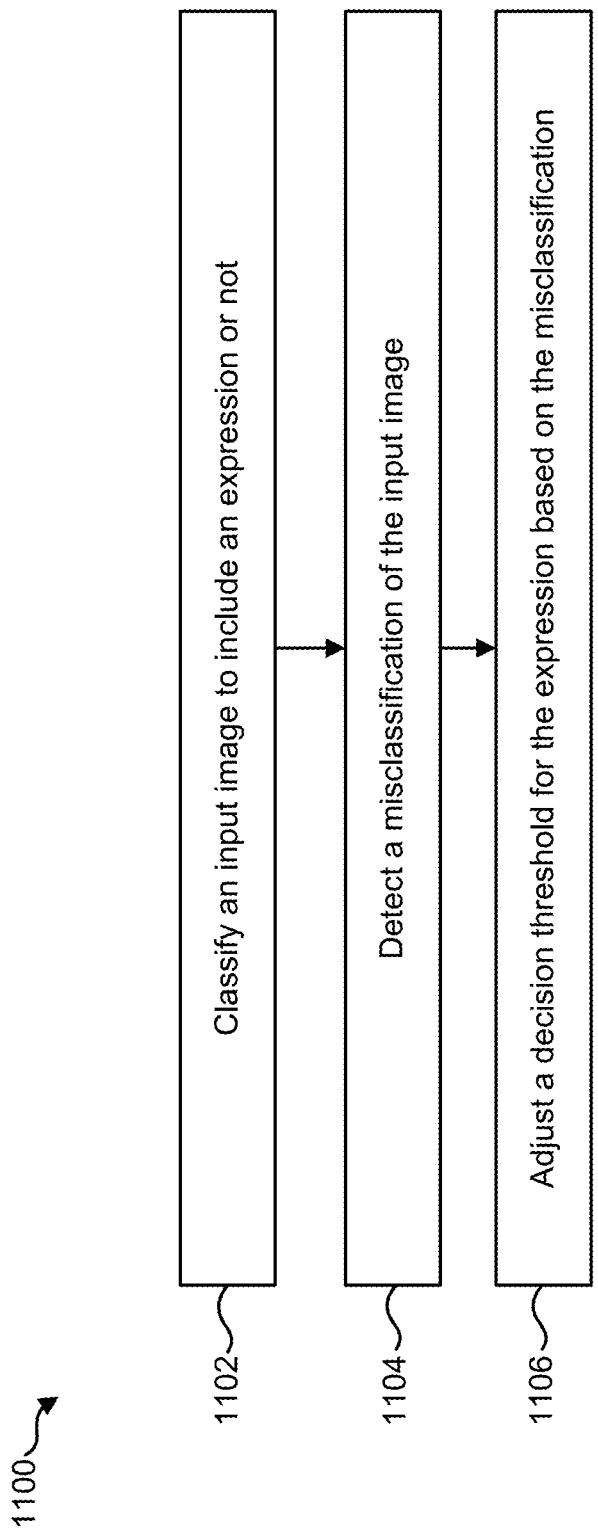
FIG. 11 is a flow diagram illustrating a method for adjusting a decision threshold.

FIG. 11 is a flow diagram illustrating a method 1100 for adjusting a decision threshold 246. The method 1100 may be performed by an electronic device 102. In one configuration, the method 1100 may be performed by a second feedback unit 242 in an electronic device 102. The electronic device 102 may classify 1102 an input image 214 to include an expression or not. In one scenario, the electronic device 102 may determine whether a face in the input image 214 includes a particular expression or not. Examples of expressions include smiling, closing eyes, anger, happy, running, etc.

The electronic device 102 may also detect 1104 a misclassification of the input image 214. For example, a smile may be incorrectly detected or a classification that eyes are shut may be determined when the eyes are actually open. Detecting 1104 a misclassification may include using a decision threshold user interface 244 in an application that uses a camera. For example, after a picture (e.g., input image 214) is taken, the decision threshold user interface 244 may present the input image 214 and the classification (e.g., the expression decision 248) to the user and ask if it is correct. The user may then have the opportunity to verify that the classification is correct or identify a misclassification. Alternatively, a misclassification may be inferred from deletion of an image 214 by the user. For example, if the classification of the image 214 was incorrect, the user may delete the image 214.

The electronic device 102 may adjust 1106 a decision threshold 246 for the expression based on the misclassification. In one configuration, a decision threshold user interface 244 may ask a user if they would like to adjust the decision threshold 246 to make an expression more or less frequently recognized in images 214. For example, the decision threshold 246 may start at a point that makes classifying a particular expression 50% likely, and then proceed to adjust 1106 the decision threshold 246 based on subsequent input received at the decision threshold user interface 244. In one implementation, the decision threshold 246 may be specific to an expression or a person. In another configuration, a decision threshold user interface 244 may show a sliding bar that gives the user an option to adjust 1106 the decision threshold 246 by sliding the bar on the screen (e.g., touchscreen 108) or by entering the value manually.

The adjustment 1106 to the decision threshold 246 may depend on the type of classifier 232 used. SVM may calculate a signed distance to the hyper-plane using Equation (3).

$$a_n x_n + a_{n-1} x_{n-1} + \ldots + a_0 \tag{3}$$

In Equation (3), $a_n$ is a real valued coefficient and $x_n$ is a support vector. If SVM is used, the adjusting 1106 may include adding or subtracting a pre-defined constant term to Equation (3). KNN calculates the minimum distance to K-nearest neighbors. If KNN is used, the adjusting 1106 may include increasing or decreasing a pre-defined threshold of the minimum allowed distance to a class or by weighting one of the classes with real value. A boosting algorithm (e.g., Boost or Gentle Boost) may calculate a decision threshold 246 according to Equation (4):

$$H(x) = \operatorname{sign}\left(\sum_{i=1}^{N} a_i h_i(x)\right) \tag{4}$$

In Equation (4), $a_i$ is a real valued coefficient, $h_i$ is one of learned weak classifiers and i is an index and N is the number of learned weak classifiers. If the boosting algorithm is used, the electronic device 102 may add or subtract a pre-defined constant to shift the sum of classifiers in Equation (4).

Alternatively, the decision threshold 246 can be changed for any classification algorithm by transforming the output of the classifier 232 to a probability or a likelihood function. In the sense, given the signed distance of SVM or that of a boosting algorithm or the distance computed by KNN, any of these distances may be transformed to a likelihood value between 0 and 1 using Equation (5).

$$P = \frac{1}{1 + \exp(-d)} \tag{5}$$

In Equation (5), d is the calculated distance as for example Equation (3) for SVM or Equation (4) for boost. Equation (5) will result in a value between 0 and 1. The value 0.5 and above may be assigned in one setting of an expression being existing in the image 214 or ROI image 226 and a value less than 0.5 means otherwise. To change the decision threshold 246, a margin lower or higher than 0.5 can be chosen.

In one configuration, the value may also be multiplied by a constant like 100 to make the numbers scale between 0% and 100%, if needed. The decision threshold 246, in this case, will initially be 50%. In one implementation, the decision threshold 246 may be adjusted 1106 (e.g., made lower or higher) automatically. In another implementation, the decision threshold 246 may be adjusted 1106 interactively by the user by adjusting a sliding bar on a screen. In yet another implementation, the decision threshold 246 may be adjusted 1106 by manually entering a value for the decision threshold 246.

Figure 12:
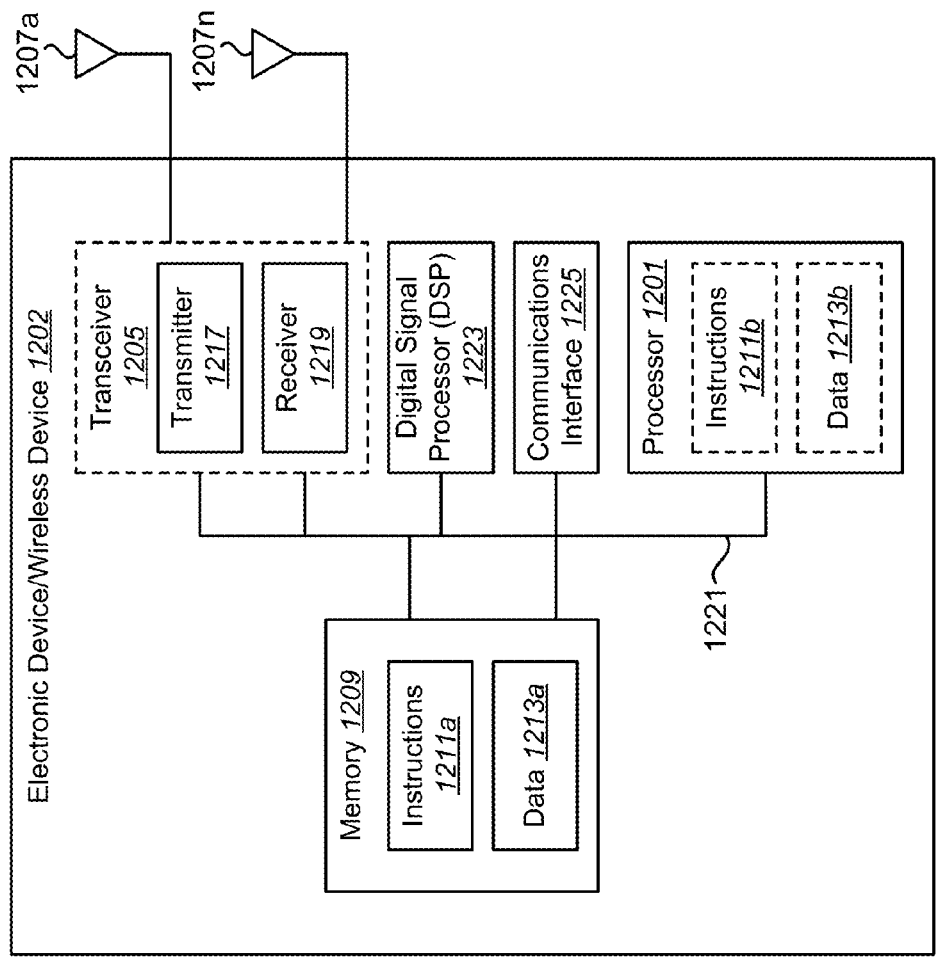
FIG. 12 illustrates certain components that may be included within an electronic device/wireless device.

FIG. 12 illustrates certain components that may be included within an electronic device/wireless device 1202. The electronic device/wireless device 1202 may be implemented in accordance with the electronic device 102 described above. The electronic device/wireless device 1202 may be an access terminal, a mobile station, a user equipment, etc. The electronic device/wireless device 1202 includes a processor 1201. The processor 1201 may be a general purpose single- or multi-chip microprocessor (e.g., an Advanced RISC (Reduced Instruction Set Computer) Machine (ARM) processor), a special purpose microprocessor (e.g., a digital signal processor (DSP)), a microcontroller, a programmable gate array, etc. The processor 1201 may be referred to as a central processing unit (CPU). Although just a single processor 1201 is shown in the electronic device/wireless device 1202 of FIG. 12, in an alternative configuration, a combination of processors (e.g., an ARM and DSP) could be used.

The electronic device/wireless device 1202 also includes memory 1209. The memory 1209 may be any electronic component capable of storing electronic information. The memory 1209 may be embodied as random access memory (RAM), read-only memory (ROM), magnetic disk storage media, optical storage media, flash memory devices in RAM, on-board memory included with the processor, erasable programmable read-only memory (EPROM), electrically erasable PROM (EEPROM), registers and so forth, including combinations thereof.

Data 1213a and instructions 1211a may be stored in the memory 1209. The instructions 1211a may be executable by the processor 1201 to implement the methods disclosed herein. Executing the instructions 1211a may involve the use of the data 1213a that is stored in the memory 1209. When the processor 1201 executes the instructions 1211a, various portions of the instructions 1211b may be loaded onto the processor 1201, and various pieces of data 1213b may be loaded onto the processor 1201.

The electronic device/wireless device 1202 may also include a transmitter 1217 and a receiver 1219 to allow transmission and reception of signals to and from the electronic device/wireless device 1202. The transmitter 1217 and receiver 1219 may be collectively referred to as a transceiver 1205. Multiple antennas 1207a-n may be electrically coupled to the transceiver 1205. The electronic device/wireless device 1202 may also include (not shown) multiple transmitters, multiple receivers, multiple transceivers and/or additional antennas.

The electronic device/wireless device 1202 may include a digital signal processor (DSP) 1223. The electronic device/wireless device 1202 may also include a communications interface 1225. The communications interface 1225 may allow a user to interact with the electronic device/wireless device 1202.

The various components of the electronic device/wireless device 1202 may be coupled together by one or more buses, which may include a power bus, a control signal bus, a status signal bus, a data bus, etc. For the sake of clarity, the various buses are illustrated in FIG. 12 as a bus system 1221.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refer to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3, 4, 6 and 9-11 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for deformable expression detection, comprising:
   combining, for each pixel in a preprocessed image, a sign of a first directional gradient component and a sign of a second directional gradient component to produce a combined sign;
   coding each combined sign into a coded value; and
   detecting an expression in an input image based on the coded values.

2. The method of claim 1, further comprising preprocessing the input image to produce the preprocessed image, comprising:
   aligning an input image based on a region of interest (ROI);
   cropping the ROI in the input image;
   scaling the ROI; and
   equalizing a histogram of the ROI.

3. The method of claim 1, wherein the directional gradient components are orthonormal.

4. The method of claim 3, wherein the directional gradient components are vertical and horizontal directional gradient components or 45-degree and 135-degree directional gradient components.

5. The method of claim 1, wherein the coding comprises coding each combined sign into a coded value based on the signs of the directional gradient components without determining the value of the magnitude of the directional gradient components.

6. The method of claim 1, wherein the expression comprises smiling, blinking or anger.

7. The method of claim 1, wherein detecting an expression comprises classifying a feature vector using a machine learning algorithm.

8. The method of claim 7, wherein the machine learning algorithm is a Support Vector Machines (SVM) algorithm, a boosting algorithm or a K-Nearest Neighbors (KNN) algorithm.

9. The method of claim 1, further comprising updating a classification error, comprising:
   classifying an input image to include an expression or not;
   detecting a misclassification of the input image; and
   updating a classifier based on the misclassification.

10. The method of claim 9, wherein detecting the misclassification comprises:
    presenting the input image and a classification to a user; and
    receiving user input as to whether the classification is correct.

11. The method of claim 9, wherein detecting the misclassification comprises:
    determining that a classification is incorrect based on deletion of the input image by a user after classification.

12. The method of claim 9, wherein the updating is based on a type of classifier used to classify the input image.

13. The method of claim 9, wherein the classifier uses a machine learning algorithm.

14. The method of claim 1, further comprising adjusting a decision threshold, comprising:
    classifying an input image to include an expression or not;
    detecting a misclassification of the input image; and
    adjusting a decision threshold for the expression manually or based on the misclassification.

15. The method of claim 14, wherein detecting the misclassification comprises:
    presenting the input image and a classification to a user; and
    receiving user input as to whether the classification is correct.

16. The method of claim 14, wherein detecting the misclassification comprises:
    determining that a classification is incorrect based on deletion of the input image by a user after classification.

17. The method of claim 14, wherein the adjusting is based on a type of classifier used to classify the input image.

18. The method of claim 14, wherein adjusting the decision threshold for the expression manually comprises showing a sliding bar that gives a user an option to adjust the threshold by sliding the bar on the screen or entering a value manually.

19. The method of claim 14, wherein the classifying comprises classifying a feature vector using a machine learning algorithm.

20. An apparatus for deformable expression detection, comprising:
    a processor;
    memory in electronic communication with the processor; and
    instructions stored in memory, the instructions being executable to:

combine, for each pixel in a preprocessed image, a sign of a first directional gradient component and a sign of a second directional gradient component to produce a combined sign;
code each combined sign into a coded value; and
detect an expression in an input image based on the coded values.

21. The apparatus of claim 20, wherein the directional gradient components are orthonormal.

22. The apparatus of claim 20, wherein the instructions being executable to code comprise instructions being executable to code each combined sign into a coded value based on the signs of the directional gradient components without determining the value of the magnitude of the directional gradient components.

23. The apparatus of claim 20, further comprising instructions being executable to:
classify an input image to include an expression or not;
detect a misclassification of the input image; and
update a classifier based on the misclassification.

24. The apparatus of claim 23, wherein the instructions being executable to detect the misclassification comprise instructions being executable to:
present the input image and a classification to a user; and
receive user input as to whether the classification is correct.

25. The apparatus of claim 23, wherein the instructions being executable to detect the misclassification comprise instructions being executable to determine that a classification is incorrect based on deletion of the input image by a user after classification.

26. The apparatus of claim 20, further comprising instructions being executable to:
classify an input image to include an expression or not;
detect a misclassification of the input image; and
adjust a decision threshold for the expression manually or based on the misclassification.

27. The apparatus of claim 26, wherein the instructions being executable to detect the misclassification comprise instructions being executable to:
present the input image and a classification to a user; and
receive user input as to whether the classification is correct.

28. The apparatus of claim 26, wherein the instructions being executable to detect the misclassification comprise instructions being executable to determine that a classification is incorrect based on deletion of the input image by a user after classification.

29. The apparatus of claim 26, wherein the instructions being executable to adjust the decision threshold manually comprise instructions being executable to show a sliding bar that gives a user an option to adjust the threshold by sliding the bar on the screen or entering a value manually.

30. An apparatus for deformable expression detection, comprising:
means for combining, for each pixel in a preprocessed image, a sign of a first directional gradient component and a sign of a second directional gradient component to produce a combined sign;
means for coding each combined sign into a coded value; and
means for detecting an expression in an input image based on the coded values.

31. The apparatus of claim 30, wherein the directional gradient components are orthonormal.

32. The apparatus of claim 30, wherein the means for coding comprise means for coding each combined sign into a coded value based on the signs of the directional gradient components without determining the value of the magnitude of the directional gradient components.

33. The apparatus of claim 30, further comprising:
means for classifying an input image to include an expression or not;
means for detecting a misclassification of the input image; and
means for updating a classifier based on the misclassification.

34. The apparatus of claim 33, wherein the means for detecting the misclassification comprise:
means for presenting the input image and a classification to a user; and
means for receiving user input as to whether the classification is correct.

35. The apparatus of claim 33, wherein the means for detecting the misclassification comprise:
means for determining that a classification is incorrect based on deletion of the input image by a user after classification.

36. The apparatus of claim 30, further comprising:
means for classifying an input image to include an expression or not;
means for detecting a misclassification of the input image; and
means for adjusting a decision threshold for the expression manually or based on the misclassification.

37. The apparatus of claim 36, wherein the means for detecting the misclassification comprise:
means for presenting the input image and a classification to a user; and
means for receiving user input as to whether the classification is correct.

38. The apparatus of claim 36, wherein the means for detecting the misclassification comprise:
means for determining that a classification is incorrect based on deletion of the input image by a user after classification.

39. The apparatus of claim 36, wherein the means for adjusting the decision threshold for the expression manually comprise means for adjusting a sliding bar that gives a user an option to adjust the threshold by sliding the bar on the screen or entering a value manually.

40. A computer-program product for deformable expression detection, comprising a non-transitory computer-readable medium having instructions thereon, the instructions comprising:
code for causing an electronic device to combine, for each pixel in a preprocessed image, a sign of a first directional gradient component and a sign of a second directional gradient component to produce a combined sign;
code for causing the electronic device to code each combined sign into a coded value; and
code for causing the electronic device to detect an expression in an input image based on the coded values.

41. The computer-program product of claim 40, wherein the directional gradient components are orthonormal.

42. The computer-program product of claim 40, wherein the code for causing the electronic device to code each combined sign comprises code for causing the electronic device to code each combined sign into a coded value based on the signs of the directional gradient components without determining the value of the magnitude of the directional gradient components.

43. The computer-program product of claim 40, further comprising:

code for causing the electronic device to classify an input image to include an expression or not;
code for causing the electronic device to detect a misclassification of the input image; and
code for causing the electronic device to update a classifier based on the misclassification.

44. The computer-program product of claim 43, wherein the code for causing the electronic device to detect the misclassification comprises:
   code for causing the electronic device to present the input image and a classification to a user; and
   code for causing the electronic device to receive user input as to whether the classification is correct.

45. The computer-program product of claim 43, wherein the code for causing the electronic device to detect the misclassification comprises:
   code for causing the electronic device to determine that a classification is incorrect based on deletion of the input image by a user after classification.

46. The computer-program product of claim 40, further comprising:
   code for causing the electronic device to classify an input image to include an expression or not;
   code for causing the electronic device to detect a misclassification of the input image; and
   code for causing the electronic device to adjust a decision threshold for the expression manually or based on the misclassification.

47. The computer-program product of claim 46, wherein the code for causing the electronic device to detect the misclassification comprises:
   code for causing the electronic device to present the input image and a classification to a user; and
   code for causing the electronic device to receive user input as to whether the classification is correct.

48. The computer-program product of claim 46, wherein the code for causing the electronic device to detect the misclassification comprises:
   code for causing the electronic device to determine that a classification is incorrect based on deletion of the input image by a user after classification.

49. The computer-program product of claim 46, wherein the code for adjusting the decision threshold for the expression manually comprises code for adjusting a sliding bar that gives a user an option to adjust the threshold by sliding the bar on the screen or entering a value manually.

* * * * *